US008417096B2

(12) United States Patent
Gharaat et al.

(10) Patent No.: US 8,417,096 B2
(45) Date of Patent: Apr. 9, 2013

(54) METHOD AND AN APPARATUS FOR DETERMINING A PLAYING POSITION BASED ON MEDIA CONTENT FINGERPRINTS

(75) Inventors: Amir H. Gharaat, Menlo Park, CA (US); James M. Barton, Alviso, CA (US); Mukesh K. Patel, Fremont, CA (US)

(73) Assignee: TiVo Inc., Alviso, CA (US)

( * ) Notice: Subject to any disclaimer, the term of this patent is extended or adjusted under 35 U.S.C. 154(b) by 569 days.

(21) Appl. No.: 12/631,775

(22) Filed: Dec. 4, 2009

(65) Prior Publication Data

US 2011/0064386 A1    Mar. 17, 2011

Related U.S. Application Data

(60) Provisional application No. 61/242,277, filed on Sep. 14, 2009.

(51) Int. Cl.
*H04N 9/80* (2006.01)

(52) U.S. Cl. ............................................... 386/249

(58) Field of Classification Search .......... 386/249–251, 386/278; 382/118
See application file for complete search history.

(56) References Cited

U.S. PATENT DOCUMENTS

| | | | | |
|---|---|---|---|---|
| 4,420,769 A | * | 12/1983 | Novak | 348/180 |
| 4,750,213 A | * | 6/1988 | Novak | 455/3.01 |
| 5,343,251 A | * | 8/1994 | Nafeh | 348/571 |
| 5,469,207 A | | 11/1995 | Chambers | |
| 5,504,518 A | * | 4/1996 | Ellis et al. | 725/22 |
| 5,668,917 A | * | 9/1997 | Lewine | 386/250 |
| 5,748,263 A | * | 5/1998 | Ball | 348/734 |
| 6,167,428 A | | 12/2000 | Ellis | |

(Continued)

FOREIGN PATENT DOCUMENTS

| | | |
|---|---|---|
| JP | 405205343 | 8/1993 |
| JP | 2004-222014 A | 8/2004 |

(Continued)

OTHER PUBLICATIONS

WIPO, "System and Method for Analyzing Video Content Using Detected Text Video, Patent Scope, Frames" http://www.wipo.int/patentscope/search/en/detail.jsf?docId=EP13463397&recNum=1 &max, dated Apr. 9, 2012, 1 page.

(Continued)

*Primary Examiner* — David Harvey
(74) *Attorney, Agent, or Firm* — Hickman Palermo Truong Becker Bingham Wong LLP

(57) ABSTRACT

A method for determining a playing position of media content based on media content fingerprints is described. In an embodiment, the playing of an advertisement may be detected by determining that one or more fingerprints of media content being played are associated with an advertisement portion of the media content. In an embodiment, an advertisement may be detected by identifying the persons associated with the faces in the advertisement portion of the media content and determining that the identified persons are not actors listed for the media content. In an embodiment, the advertisement may be enhanced with additional content pertaining to the product or service being advertised. In an embodiment, the advertisement may be automatically fast-forwarded, muted, or replaced with an alternate advertisement. In an embodiment, only a non-advertisement portion of the media content may be recorded by skipping over the detected advertisement portion of the media content.

15 Claims, 12 Drawing Sheets

U.S. PATENT DOCUMENTS

| | | | |
|---|---|---|---|
| 6,243,445 B1 | 6/2001 | Begeja et al. | |
| 6,469,749 B1 * | 10/2002 | Dimitrova et al. | 348/722 |
| 6,725,250 B1 | 4/2004 | Ellis | |
| 6,771,316 B1 * | 8/2004 | Iggulden | 348/553 |
| 6,771,885 B1 | 8/2004 | Agnihotri et al. | |
| 6,963,897 B1 | 11/2005 | Hubbard | |
| 7,080,392 B1 * | 7/2006 | Geshwind | 725/34 |
| 7,170,566 B2 * | 1/2007 | McGee et al. | 348/722 |
| 7,477,739 B2 * | 1/2009 | Haitsma et al. | 380/201 |
| 7,548,950 B2 | 6/2009 | Numakami et al. | |
| 7,738,704 B2 | 6/2010 | Lienhart et al. | |
| 7,774,407 B2 | 8/2010 | Daly et al. | |
| 7,784,078 B2 | 8/2010 | Ohnuma et al. | |
| 7,908,635 B2 | 3/2011 | Barton et al. | |
| 7,930,714 B2 * | 4/2011 | Konig et al. | 725/32 |
| 7,984,473 B1 | 7/2011 | Casile et al. | |
| 8,032,383 B1 | 10/2011 | Bhardwaj et al. | |
| 8,156,520 B2 * | 4/2012 | Casagrande et al. | 725/32 |
| 2001/0023431 A1 | 9/2001 | Horiguchi | |
| 2002/0037104 A1 | 3/2002 | Myers et al. | |
| 2002/0099552 A1 | 7/2002 | Rubin et al. | |
| 2002/0099774 A1 | 7/2002 | Yamato et al. | |
| 2002/0124252 A1 | 9/2002 | Schaefer et al. | |
| 2002/0152117 A1 | 10/2002 | Cristofalo et al. | |
| 2003/0093580 A1 | 5/2003 | Thomas et al. | |
| 2003/0093806 A1 | 5/2003 | Dureau et al. | |
| 2003/0095791 A1 | 5/2003 | Barton et al. | |
| 2003/0126267 A1 * | 7/2003 | Gutta et al. | 709/229 |
| 2003/0163823 A1 | 8/2003 | Logan et al. | |
| 2003/0177503 A1 | 9/2003 | Sull et al. | |
| 2004/0043724 A1 * | 3/2004 | Weast | 455/3.01 |
| 2004/0059570 A1 | 3/2004 | Mochinaga et al. | |
| 2004/0220858 A1 | 11/2004 | Maggio | |
| 2004/0250212 A1 | 12/2004 | Fish | |
| 2005/0022251 A1 | 1/2005 | Ohnuma et al. | |
| 2005/0028161 A1 | 2/2005 | Numakami et al. | |
| 2005/0044561 A1 | 2/2005 | McDonald | |
| 2005/0172312 A1 | 8/2005 | Lienhart et al. | |
| 2005/0239545 A1 | 10/2005 | Rowe | |
| 2006/0015609 A1 | 1/2006 | Hagale et al. | |
| 2006/0036688 A1 | 2/2006 | McMahan et al. | |
| 2006/0064721 A1 | 3/2006 | Del Val et al. | |
| 2006/0074658 A1 | 4/2006 | Chadha | |
| 2006/0195859 A1 | 8/2006 | Konig et al. | |
| 2006/0239642 A1 | 10/2006 | Yuasa et al. | |
| 2006/0245625 A1 | 11/2006 | Tichelaar et al. | |
| 2007/0001806 A1 | 1/2007 | Poll | |
| 2007/0083887 A1 * | 4/2007 | Gutta et al. | 725/35 |
| 2007/0112939 A1 | 5/2007 | Wilson et al. | |
| 2007/0136744 A1 | 6/2007 | Simons et al. | |
| 2007/0143778 A1 | 6/2007 | Covell et al. | |
| 2007/0186242 A1 | 8/2007 | Price et al. | |
| 2007/0220045 A1 * | 9/2007 | Morris et al. | 707/104.1 |
| 2007/0250716 A1 | 10/2007 | Brunk et al. | |
| 2008/0170836 A1 | 7/2008 | Kinoshita et al. | |
| 2008/0281601 A1 | 11/2008 | Reichardt et al. | |
| 2009/0088207 A1 | 4/2009 | Sweeney et al. | |
| 2009/0097814 A1 * | 4/2009 | Harris | 386/46 |
| 2009/0103893 A1 | 4/2009 | Sugino et al. | |
| 2009/0133070 A1 | 5/2009 | Hamano et al. | |
| 2009/0317052 A1 | 12/2009 | Sezan et al. | |
| 2010/0111269 A1 | 5/2010 | Younger et al. | |
| 2010/0131571 A1 * | 5/2010 | Reuveni | 707/803 |
| 2011/0085781 A1 | 4/2011 | Olson | |

FOREIGN PATENT DOCUMENTS

| | | |
|---|---|---|
| JP | 2004-320608 A | 11/2004 |
| JP | 2004-264186 | 12/2004 |
| JP | 2005-110047 | 4/2005 |
| JP | 2007-173918 A | 7/2007 |
| WO | WO 00/13416 | 3/2000 |
| WO | WO 00/45291 | 8/2000 |

OTHER PUBLICATIONS

Nokai et al., Machine Generated Translation of JP 2004-364186, dated Dec. 2004.

* cited by examiner

METHOD AND AN APPARATUS FOR DETERMINING A PLAYING POSITION BASED ON MEDIA CONTENT FINGERPRINTS

PRIORITY INFORMATION

The present invention claims priority under 35 U.S.C. 119 (e) of provisional application No. 61/242,277 filed on Sep. 14, 2009.

FIELD OF THE INVENTION

The present invention relates to a multifunction multimedia device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multimedia content streams may be received by a multimedia player for display to a user. Furthermore, general information about multimedia content may be received by the multimedia player for display to the user. The multimedia content is generally presented in a fixed non-editable format. The user is able to jump to particular points in the media content via scene selections created by the producer. Accordingly, the watching of the media content is generally passive and the user interaction is minimal.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
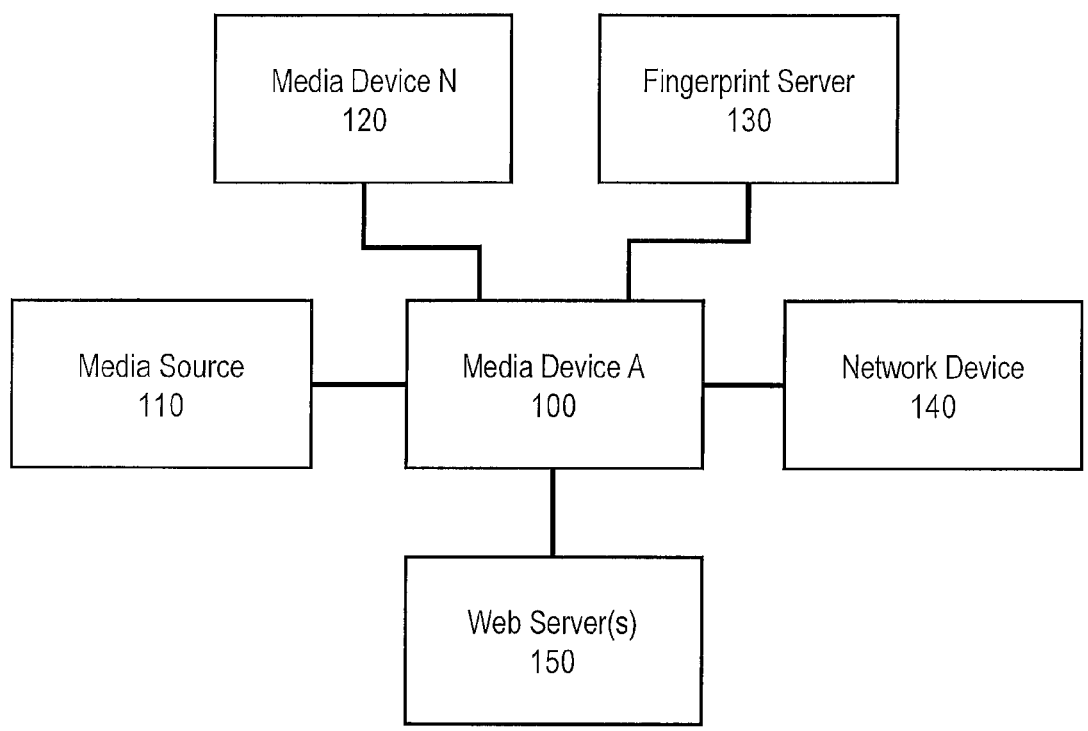
FIG. 1A is a block diagram illustrating an example system in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 FUNCTIONAL OVERVIEW
  2.0 SYSTEM ARCHITECTURE
  3.0 PRESENTING ADDITIONAL CONTENT BASED ON MEDIA CONTENT FINGERPRINTS
  4.0 DETERMINING A PLAYING POSITION BASED ON MEDIA CONTENT FINGERPRINTS
  5.0 PUBLISHING RECORDING OR VIEWING INFORMATION
  6.0 DERIVING A FINGERPRINT FROM MEDIA CONTENT
  7.0 PRESENTING UPDATES
  8.0 INTERPRETING COMMANDS
  9.0 CORRELATING INPUT WITH MEDIA CONTENT
  10.0 ELICITING ANNOTATIONS BY A PERSONAL MEDIA DEVICE
  11.0 MARKING MEDIA CONTENT
  12.0 PUBLICATION OF MEDIA CONTENT ANNOTATIONS
  13.0 AUTOMATICALLY GENERATED ANNOTATIONS
  14.0 ENVIRONMENT CONFIGURATION
  15.0 HARDWARE OVERVIEW
  16.0 EXTENSIONS AND ALTERNATIVES 1.0 Functional Overview In an embodiment, media content is received and presented to a user. A fingerprint derived from the media content is then used to query a server to identify the media content. Based on the media content identified based on the fingerprint, additional content is obtained and presented to the user.

In an embodiment, the additional content may include an advertisement (e.g., for a product, service, or other media content), which is selected based on the identified media content.

In an embodiment, a fingerprint is derived dynamically from the media content subsequent to receiving a command to present the media content. In an embodiment, the fingerprint is derived dynamically from the media content subsequent to receiving a command to present additional content associated with the media content being presented.

In an embodiment, a face is detected in the media content based on the fingerprint derived from the media content. A name of a person associated with the face is determined and presented in the additional content. Detecting the face and/or determining the name of the person associated with the face may be dynamically performed in response to receiving a user command.

In an embodiment, features (e.g., objects, structures, landscapes, locations, etc.) in media content frames may be detected based on the fingerprint derived from the media content. The features may be identified and the identification may be presented. The features may be identified and/or the identification presented in response to a user command.

In an embodiment, fingerprints may be dynamically derived concurrently with playing the media content. A position in the playing of the media content may then be determined based on the fingerprints.

In an embodiment, additional content may be presented based on the position in the playing of the media content. In an embodiment, the additional content based on the position in the playing of the media content may be presented in response to a user command.

In an embodiment, playing of the media content may be synchronized over multiple devices based on the position in the playing of the media content. In an embodiment, synchronization over multiple devices may be performed by starting the playing of media content on multiple devices at the same time, seeking to an arbitrary position of the media content on a device or delaying the playing of media content on a device. During synchronized playing of the media content on multiple devices, a command to fast-forward, rewind, pause, stop, seek, or play on one device may be performed on all synchronized devices. In an embodiment, a determination may be made that advertisements are being played based on the position in the playing of the media content. The advertisement may be skipped over or fast-forwarded through based on the position in the playing of the media content. In an embodiment, a notification may be provided that the advertisement was played or the speed at which the advertisement was played. In an embodiment, the advertisement may be selected based on the position in the playing of the media content.

In an embodiment, the playing of an advertisement may be detected by determining that one or more fingerprints of the media content being played are associated with an advertisement portion of the media content. In an embodiment, an advertisement may be detected by identifying the persons associated with the faces in the advertisement portion of the media content and determining that the identified persons are not actors listed for the media content. In an embodiment, the advertisement may be enhanced with additional content pertaining to the product or service being advertised. In an embodiment, the advertisement may be automatically fast-forwarded, muted, or replaced with an alternate advertisement. In an embodiment, only a non-advertisement portion of the media content may be recorded by skipping over the detected advertisement portion of the media content.

In an embodiment, a command is received to record particular media content on a first device associated with a first user and the particular media content is scheduled for recording on the first device. A notification is provided to a second device associated with a second user of the scheduling of the recording of the particular media content on the first device. The second device may then schedule recording of the particular media content. The second device may schedule the recording of the particular media content without receiving a user command or subsequent to receiving a user confirmation to record the particular media content in response to the notification.

In an embodiment, a command may be received from the second user by the second device to record all media content that is scheduled for recording on first device, any one of a plurality of specified devices, or a device associated with any of a plurality of specified users.

In an embodiment, the scheduled recording of a particular media content on multiple devices may be detected. In response to detecting that the particular media content is scheduled for recording on multiple devices, a notification may be provided to at least one of the multiple devices that the particular media content is scheduled for recording on the multiple devices. The particular media content may then be synchronously displayed on the multiple devices. A time may be selected by one of the devices to synchronously play the particular media content on the multiple devices based on a user availability calendar accessible through each of the devices. A time may also be suggested to receive a user confirmation for the suggested time.

In an embodiment, a command to record or play a particular media content on a device associated with a user may be received. Responsive to the command, the particular media content may be recorded or played and information may be published in association with the user indicating that the user is recording or playing the particular media content. The information may be automatically published to a web service for further action, such as display on a web page. Responsive to the command, information associated with the particular media content may be obtained and presented to the user. In an embodiment, a group (e.g., on a social networking website) may be automatically created for users associated with devices playing or recording the particular media content.

In an embodiment, a media device meeting an idleness criteria may be detected. In response to detecting an idleness criteria, media content may be sent to the media device. The media device may be configured to receive a particular content stream or streams accessible via the internet comprising the media content. The media device may derive a fingerprint from the media content and send the fingerprint to a fingerprint database, along with additional data pertaining to the media (such as title, synopsis, closed caption text, etc). Detecting that a media device meets an idleness criteria may involve receiving a signal from the media device, the media device completing a duration of time without receiving a user command at the media device, or determining that the media content has resource availability for deriving a fingerprint.

In an embodiment, concurrently with playing audio/video (AV) content, a message is received. The message is interpreted based on message preferences associated with a user and the user is presented with the message based on the message preferences. In an embodiment, one or more messages may be filtered out based on message preferences.

In an embodiment, presenting messages includes overlaying information associated with the message on one or more video frames of the AV content being played to the user. Presenting the message may include playing audio information associated with the message. In an embodiment, AV content is paused or muted when messages are presented.

In an embodiment, messages are submitted by another user as audio input, textual input or graphical input. Audio input may include a voice associated with the sender of the message, the receiver of the message, a particular fictional character, or non-fictional character, or a combination thereof. The messages may be played exclusively to the recipient of the message.

In an embodiment, a message may be presented during a time period specified by a message preference. A message may be held until a commercial break during the playing of the AV content and presented during the commercial break. In an embodiment, a message maybe received from a message service associated with a social networking website.

In an embodiment, a user-defined alert condition is received from a user. AV content is played concurrently with monitoring for occurrence of the user-defined alert condition and occurrence of the user-defined alert condition is detected. An alert may be presented in response to detecting occurrence of the user-defined alert condition.

In an embodiment, detecting the alert condition includes determining that media content determined to be of interest to a user is being available on a content stream. In an embodiment, detecting the alert condition includes determines that media content associated with user requested information is available on a content stream. Detecting the alert condition may include receiving a notification indicating occurrence of the alert condition. In an embodiment, detecting occurrence of an alert condition may include obtaining information using optical character recognition (OCT) and detecting occurrence of the alert condition based on the information.

In an embodiment, a voice command is received from a user and the user is identified based on voice command. The voice command is then interpreted based on preferences associated with the identified user to determine an action out of a plurality of actions. The action is then performed.

In an embodiment, a number of applicable users for the voice command is determined. The number of applicable users may be determined by recognizing users based on voice input.

In an embodiment, the action based on user preferences may include configuring a multimedia device or an environment, presenting messages, making a purchase, or performing another suitable action. In an embodiment, an action may be presented for user confirmation prior to performing the action or checked to ensure that the user permission to execute the action. In an embodiment, the voice command may be interpreted based on the language in which the voice command was received.

In an embodiment, concurrently with playing media content on a multimedia device, an annotation(s) is received from a user. The annotation is stored in associated with the media content. In an embodiment, the annotation may include audio input, textual input, and/or graphical input. In an embodiment, the media content is played a second time concurrently with audio input received from the user. Playing the media content the second time may involve playing only a video portion of the media content with the audio input received from the user.

In an embodiment, multiple versions of annotations may be received during different playbacks of the media content and each annotation may be stored in association with the media content. The annotations may be provided in languages different than the original language of the audio portion of the media content. Annotations may be provided with instructions associated with intended playback. Annotations may include automatically generated audio based on information obtained using optical character recognition. In an embodiment, annotations may be analyzed to derive annotation patterns associated with media content. Annotations may be elicited from a user and may include reviews of media content. In an embodiment, user profiles may be generated based on annotations. Annotations may mark intervals or particular points in the playing of media content, which may be used as bookmarks to resume playing of the media content. Intervals marked by annotations may be skipped during a subsequent playing of the media content or used to create a play sequence.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

2.0 System Architecture

Although a specific computer architecture is described herein, other embodiments of the invention are applicable to any architecture that can be used to perform the functions described herein.

FIG. 1 shows a media device A (100), a media source (110), a media device N (120), a fingerprint server (130), a network device (140), and a web server (150). Each of these components are presented to clarify the functionalities described herein and may not be necessary to implement the invention. Furthermore, components not shown in FIG. 1 may also be used to perform the functionalities described herein. Functionalities described as performed by one component may instead be performed by another component.

In an embodiment, the media source (110) generally represents any content source from which the media device A (100) can receive media content. The media source (110) may be a broadcaster (includes a broadcasting company/service) that streams media content to media device A (100). The media source (110) may be a media content server from which the media device A (100) downloads the media content. The media source (100) may be an audio and/or video player from which the media device A (100) receives the media content being played. The media source (100) may be a computer readable storage or input medium (e.g., physical memory, a compact disc, or digital video disc) which the media device A (100) reads to obtain the media content. The terms streaming, broadcasting, or downloading to a device may be used interchangeably herein and should not be construed as limiting to one particular method of the device obtaining data. The media device A (100) may receive data by streaming, broadcasting, downloading, etc. from a broadcast service, a web server, another media device, or any suitable system with data or content that may accessible by the media device. Different sources may be mentioned as different examples presented below. An example describing a specific source should not be construed as limited to that source.

In an embodiment, the fingerprint server (130) generally represents any server that stores fingerprints derived from media content. The fingerprint server (130) may be accessed by the media device A (100) to download and/or upload fingerprints derived from media content. The fingerprint server (130) may be managed by a content source (e.g., a broadcast service, a web service, or any other source of content) for storing a database of fingerprints derived from media content. The content source may select media content to be fingerprinted. The media device A (100) may derive the fingerprint from selected media content and provide the fingerprint to the fingerprint server (130). In an embodiment, the fingerprint server (130) may serve as a database for identifying media content or metadata associated with media content based on the fingerprint derived from that media content. In an embodiment, at least a portion of the fingerprint server (130) is implemented on one or more media devices. The media devices may be updated continuously, periodically, or according to another suitable schedule when the fingerprint server (130) is updated.

In an embodiment, the network device (140) generally represents any component that is a part of the media device A (100) or a separate device altogether that includes functionality to communicate over a network (e.g., internet, intranet, world wide web, etc.). For example, the network device (140) may be a computer communicatively coupled with the media device A (100) or a network card in the media device A (100). The network device (140) may include functionality to publish information associated with the media device A (100) (e.g., media content scheduled for recording on the media device A (100), media content recorded on the media device A (100), media content being played on the media device A (100), media content previously played on the media device A (100), media content displayed on the media device A (100), user preferences/statistics collected by the media device A (100), user settings on the media device A (100), etc.). The network device (140) may post the information on a website, provide the information in an electronic message or text message, print the information on a network printer, or publish the information in any other suitable manner. The network device (140) may include functionality to directly provide the information to another media device(s) (e.g., media device N (120)). The network device (140) may include functionality to obtain information from a network. For example, the network device (140) may perform a search for metadata or any other additional data associated with media content and provide the search results to the media device A (100). Another example may involve the network device (140) obtaining information associated with media content scheduled, recorded, and/or played on media device N (120).

In an embodiment media device A (100) (or media device N (120)) generally represents any media device comprising a processor and configured to present media content. The media device A (100) may refer to a single device or any combination of devices (e.g., a receiver and a television set) that may be configured to present media content. Examples of the media device A (100) include one or more of: receivers, digital video recorders, digital video players, televisions, monitors, Blu-ray players, audio content players, video content players, digital picture frames, hand-held mobile devices, computers, printers, etc. The media device A (100) may present media content by playing the media content (e.g., audio and/or visual media content), displaying the media content (e.g., still images), printing the media content (e.g., coupons), electronically transmitting the media content (e.g., electronic mail), publishing the media content (e.g., on a website), or by any other suitable means. In an embodiment, media device A (100) may be a management device which communicates with one or more other media devices in a system. For example, the media device A (100) may receive commands from media device (e.g., a DVD player, a remote, a joystick, etc.) and communicate the command to another media device (e.g., a monitor, a receiver, etc.). In an embodiment, the media device A (100) may represent any apparatus with one or more subsystems configured to perform the functions described herein.

In an embodiment, the media device A (100) may include functionality to derive fingerprints from media content. For example, the media device A (100) may derive a fingerprint from media content recorded on associated memory or stored in any other accessible location (e.g., an external hard drive, a DVD, etc.). The media device A (100) may also derive a fingerprint from media content available on a content stream. Media content that is available on a content stream includes any media content that is accessible by the media device A (100). For example, content available on a content stream may include content being broadcasted by a broadcast service, content available for download from a web server, peer device, or another system, or content that is otherwise accessible by the media device A (100). In an embodiment, the media device A (100) may include functionality to obtain media content being displayed and dynamically derive fingerprints from the media content being displayed or media content stored on the media device. In an embodiment, the media device A (100) may include the processing and storage capabilities to decompress media content (e.g., video frames), modify and/or edit media content, and compress media content.

In an embodiment, the media device A (100) may include functionality to mimic another media device(s) (e.g., media device N (120)) by recording, or playing the same media content as another media device. For example, the media device A (100 may include functionality to receive notifications of media content being recorded on media device N (120) and obtain the same media content from a content source. The media device A may automatically record the media content or provide the notification to a user and record the media content in response to a user command.

Figure 1B:
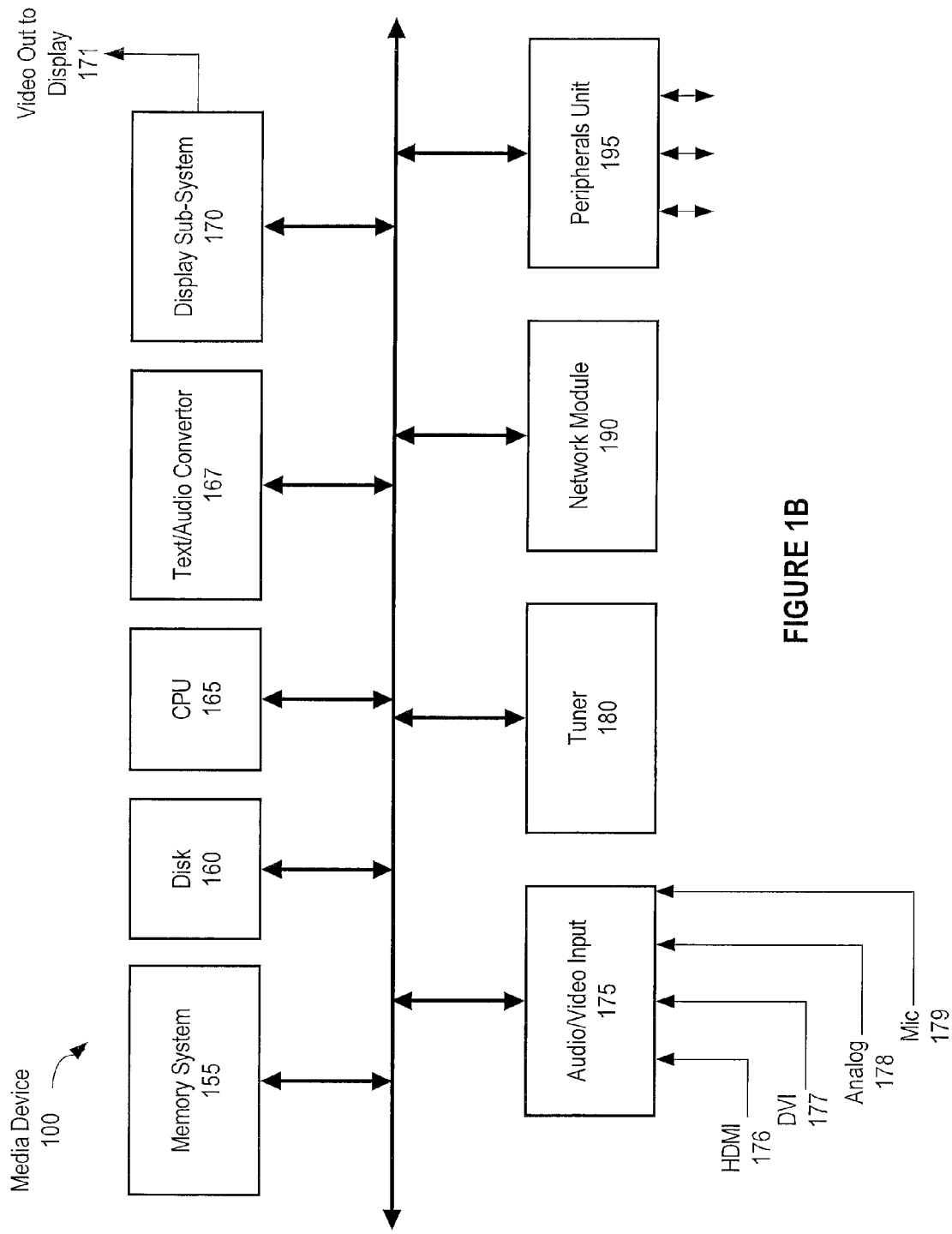
FIG. 1B is a block diagram illustrating an example media device in accordance with an embodiment.

FIG. 1B illustrates an example block diagram of a media device in accordance with one or more embodiments. As shown in FIG. 1B, the media device (100) may include multiple components such as a memory system (155), a disk (160), a central processing unit (CPU) (165), a display subsystem (170), an audio/video input (175), a tuner (180), a network module (190), peripherals unit (195), text/audio convertor (167), and/or other components necessary to perform the functionality described herein.

In an embodiment, the audio/video input (175) may correspond to any component that includes functionality to receive audio and/or video input (e.g., HDMI 176, DVI 177, Analog 178) from an external source. For example, the audio/video input (175) may be a DisplayPort or a high definition multimedia interface (HDMI) that can receive input from different devices. The audio/video input (175) may receive input from a set-top box, a Blu-ray disc player, a personal computer, a video game console, an audio/video receiver, a compact disk player, an enhanced versatile disc player, a high definition optical disc, a holographic versatile disc, a laser disc, mini disc, a disc film, a RAM disc, a vinyl disc, a floppy disk, a hard drive disk, etc. The media device (100) may include multiple audio/video inputs (175).

In an embodiment, the tuner (180) generally represents any input component that can receive a content stream (e.g., through cable, satellite, internet, network, or terrestrial antenna). The tuner (180) may allow one or more received frequencies while filtering out others (e.g., by using electronic resonance). A television tuner may convert an RF television transmission into audio and video signals which can be further processed to produce sound and/or an image.

In an embodiment, input may also be received from a network module (190). A network module (190) generally represents any input component that can receive information over a network (e.g., internet, intranet, world wide web, etc.). Examples of a network module (190) include a network card, network adapter, network interface controller (NIC), network interface card, Local Area Network adapter, Ethernet network card, and/or any other component that can receive information over a network. The network module (190) may also be used to directly connect with another device (e.g., a media device, a computer, a secondary storage device, etc.).

In an embodiment, input may be received by the media device (100) from any communicatively coupled device through wired and/or wireless communication segments. Input received by the media device (100) may be stored to the memory system (155) or disk (160). The memory system (155) may include one or more different types of physical memory to store data. For example, one or more memory buffers (e.g., an HD frame buffer) in the memory system (155) may include storage capacity to load one or more uncompressed high definition (HD) video frames for editing and/or fingerprinting. The memory system (155) may also store frames in a compressed form (e.g., MPEG2, MPEG4, or any other suitable format), where the frames are then uncompressed into the frame buffer for modification, fingerprinting, replacement, and/or display. The memory system (155) may include FLASH memory, DRAM memory, EEPROM, traditional rotating disk drives, etc. The disk (160) generally represents secondary storage accessible by the media device (100).

In an embodiment, central processing unit (165) may include functionality to perform the functions described herein using any input received by the media device (100). For example, the central processing unit (165) may be used to dynamically derive fingerprints from media content frames stored in the memory system (155). The central processing unit (165) may be configured to mark or identify media content or portions of media content based on tags, hash values, fingerprints, time stamp, or other suitable information associated with the media content. The central processing unit (165) may be used to modify media content (e.g., scale a video frame), analyze media content, decompress media content, compress media content, etc. A video frame (e.g., an HD video frame) stored in a frame buffer may be modified dynamically by the central processing unit (165) to overlay additional content (e.g., information about the frame, program info, a chat message, system message, web content, pictures, an electronic programming guide, or any other suitable content) on top of the video frame, manipulate the video frame (e.g., stretching, rotation, shrinking, etc.), or replace the video frame in real time. Accordingly, an electronic programming guide, advertisement information that is dynamically selected, media content information, or any other text/graphics may be written onto a video frame stored in a frame buffer to superimpose the additional content on top of the stored video frame. The central processing unit (165) may be used for processing communication with any of the input and/or output devices associated with the media device (100). For example, a video frame which is dynamically modified in real time may subsequently be transmitted for display. The central processing unit (165) may be used to communicate with other media devices to perform functions related to synchronization, or publication of data.

In an embodiment, the text/audio convertor (167) generally represents any software and/or hardware for converting text to audio and/or for converting audio to text. For example, the text/audio convertor may include functionality to convert text corresponding to closed captioned data to an audio file. The audio file may be based on a computerized voice, or may be trained for using the voice of a user, a fictional or non-fictional character, etc. In an embodiment, the automatically generated voice used for a particular message may be the voice of a user generating the message. The text/audio convertor may include functionality to switch languages when converting from voice to text or from text to voice. For example, audio input in French may be converted to a text message in English.

In an embodiment, the peripherals unit (195) generally represents input and/or output for any peripherals that are communicatively coupled with the media device (100) (e.g., via USB, External Serial Advanced Technology Attachment (eSATA), Parallel ATA, Serial ATA, Bluetooth, infrared, etc.). Examples of peripherals may include remote control devices, USB drives, a keyboard, a mouse, a microphone, and voice recognition devices that can be used to operate the media device (100). In an embodiment, multiple microphones may be used to detect sound, identify user location, etc. In an embodiment, a microphone may be a part of a media device (100) or other device (e.g., a remote control) that is communicatively coupled with the media device (100). In an embodiment, the media device (100) may include functionality to identify media content being played (e.g., a particular program, or a position in a particular program) when audio input is received (e.g., via a microphone) from a user.

In an embodiment, the display sub-system (170) generally represents any software and/or device that includes functionality to output (e.g., Video Out to Display 171) and/or actually display one or more images. Examples of display devices include a kiosk, a hand held device, a computer screen, a monitor, a television, etc. The display devices may use different types of screens such as a liquid crystal display, cathode ray tube, a projector, a plasma screen, etc. The output from the media device (100) may be specially for formatted for the type of display device being used, the size of the display device, resolution (e.g., 720i, 720p, 1080i, 1080p, or other suitable resolution), etc.

3.0 Presenting Additional Content Based on Media Content Fingerprints

Figure 2:
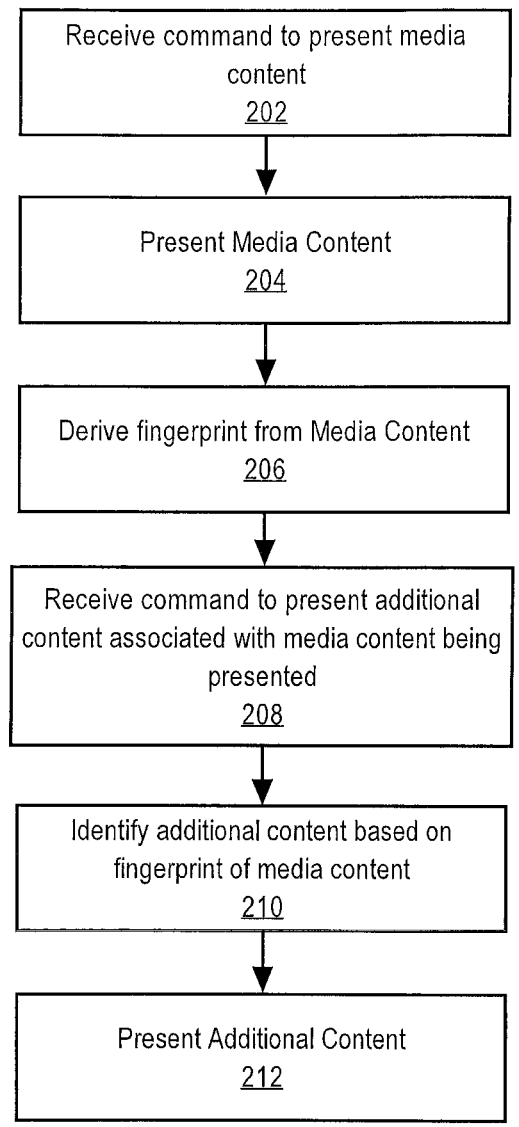
FIG. 2 illustrates a flow diagram for presenting additional content in accordance with an embodiment.

FIG. 2 illustrates a flow diagram for presenting additional content in accordance with an embodiment. One or more of the steps described below may be omitted, repeated, and/or performed in a different order. Accordingly, the specific arrangement of steps shown in FIG. 2 should not be construed as limiting the scope of the invention.

Initially, a command is received to present media content in accordance with an embodiment (Step 202). The received command may be entered by a user via a keyboard or remote control. The command may be a selection in the electronic programming guide (EPG) by a user for the recording and/or playing of the media content. The command may a channel selection entered by a user. The command may be a request to display a slide show of pictures. The command may be to play an audio file. The command may be a request to play a movie (e.g., a command for a blu-ray player). In an embodiment, receiving the command to present media content may include a user entering the title of media content in a search field on a user interface. In an embodiment, media content is presented (Step 204). Presenting the media content may include playing audio and/or visual media content (e.g., video content), displaying or printing images, etc. Presenting the media content may also involve overlaying the media content over other media content also being presented.

In an embodiment, a fingerprint is derived from the media content (Step 206). An example of deriving a fingerprint from media content includes projecting intensity values of one or more video frames onto a set of projection vectors and obtaining a set of projected values. A fingerprint bit may then be computed based on each of the projected values and concatenated to compute the fingerprint for the media content. Another example may include applying a mathematical function to a spectrogram of an audio file. Other fingerprint derivation techniques may also be used to derive a fingerprint from media content in accordance with one or more embodiments. In an embodiment, the fingerprint is derived from media content dynamically as the media content is being played. For example, media content being received from a content source may concurrently be played and fingerprinted. The fingerprint may be derived for media content recognition, e.g., identifying the particular program, movie, etc. Media streams containing 3-Dimensional video may also be fingerprinted. In an embodiment, fingerprinting 3-Dimensional video may involve selecting fingerprint portions of the 3-Dimensional video. For example, near objects (e.g., objects that appear closer when watching the 3-Dimensional video) in the 3-Dimensional video stream may be selected for fingerprinting in order to recognize a face or structure. The near objects may be selected based on a field of depth tag associated with objects or by the relative size of objects compared to other objects.

In an embodiment, a command to present additional content associated with the media content being presented, is received (Step 208). A command may be received to identify generic additional content (e.g., any feature in the media content). For example, information of the media content being played such as the plot synopsis of a movie, the actors in a movie, the year the movie was made, a time duration associated with the particular media content, a director or producer of the movie, a genre of the movie, etc. In an embodiment, specific information may be requested. For example, a command requesting the geographic location in the world of the current scene being played. Another example may involve a command requesting an identification of the people in a current scene being displayed. Another example may involve a request for the year and model of a car in a scene of the movie. Another example may involve a request to save or publish information about the content, including a timestamp, offset from beginning, and other contextual data, for later use or reference. Accordingly, the specific information requests may include identification of places, objects, or people in a scene of the media content.

The additional content requested by the user may not be available when the command for the additional content is received. Accordingly, the additional information is dynamically identified (Step 210), after receiving the command, based on a fingerprint of the media content. For example, the fingerprint derived from the media content may be used to query a web server and receive identification of the object, place, or person in a scene that matches the fingerprint. The fingerprint may also be used to identify the media content being played to obtain the metadata already associated with the media content. In an embodiment, a fingerprint may be dynamically derived from the media content after receiving the command to present additional information.

In an embodiment, the additional content is presented (Step 212). Presenting the additional content may include overlaying the additional content on top of the media content being presented to the user. Presenting the additional content may also include overlaying the additional content on portions of the frame displaced by scaling, cropping, or otherwise altering the original content. To overlay the additional content on top of the original or altered media content, uncompressed HD frame(s) may be loaded into a frame buffer and the additional data may be written into the same frame buffer, thereby overlaying original frame information with the additional data. The additional information may be related to the media content being played, EPG display data, channel indicator in a banner display format as described in U.S. Pat. No. 6,642,939, owned by the applicant and incorporated herein by reference, program synopsis, etc. For example, in a movie, a geographical location of the scene may be displayed on the screen concurrently with the scene. In another example, a field may display the names of current actors in a scene at any given time. A visual indication linking the name of an object, place, person, etc. with the object, place, person on screen may be displayed. For example, a line between a car in the scene and identifying information about the car. The additional content may also provide links to advertisers, businesses, etc. about a displayed image. For example, additional information about a car displayed on the screen may include identifying information about the car, a name of a car dealership that sells the car, a link to a car dealership that sells the car, pricing information associated with the car, safety information associated with the car, or any other information directly or tangentially related to the identified car. Another example may involve presenting information about content available on a content stream (e.g., received from a broadcast service or received from a web server). The content itself may be overlaid on the frame, or a link with a description may be overlaid on the frame, where the link can be selected through user input. The additional content may be presented as closed caption data. In another example, subtitles in a user-selected language may be overlaid on top of the content, such as a movie or TV show. The subtitles may be derived by various methods including download from an existing database of subtitle files, or real-time computational translation of closed captioning text from the original content. Another example may involve synchronized overlay of lyrics on top of a music video or concert performance. The system may perform this operation for several frames or until the user instructs it to remove the overlay. At that point, the system may discontinue writing the additional information into the frame buffer. In one embodiment, audio content may replace or overlay the audio from the original content. One example may involve replacing the audio stream of a national broadcast of a national football game with the audio stream of the local radio announcer. One example may involve a real-time mix of the audio from the original media with additional audio, such as actor's commentary on a scene. This example may involve alteration of the original and additional audio, such as amplification.

4.0 Determining a Playing Position Based on Media Content Fingerprints

Figure 3:
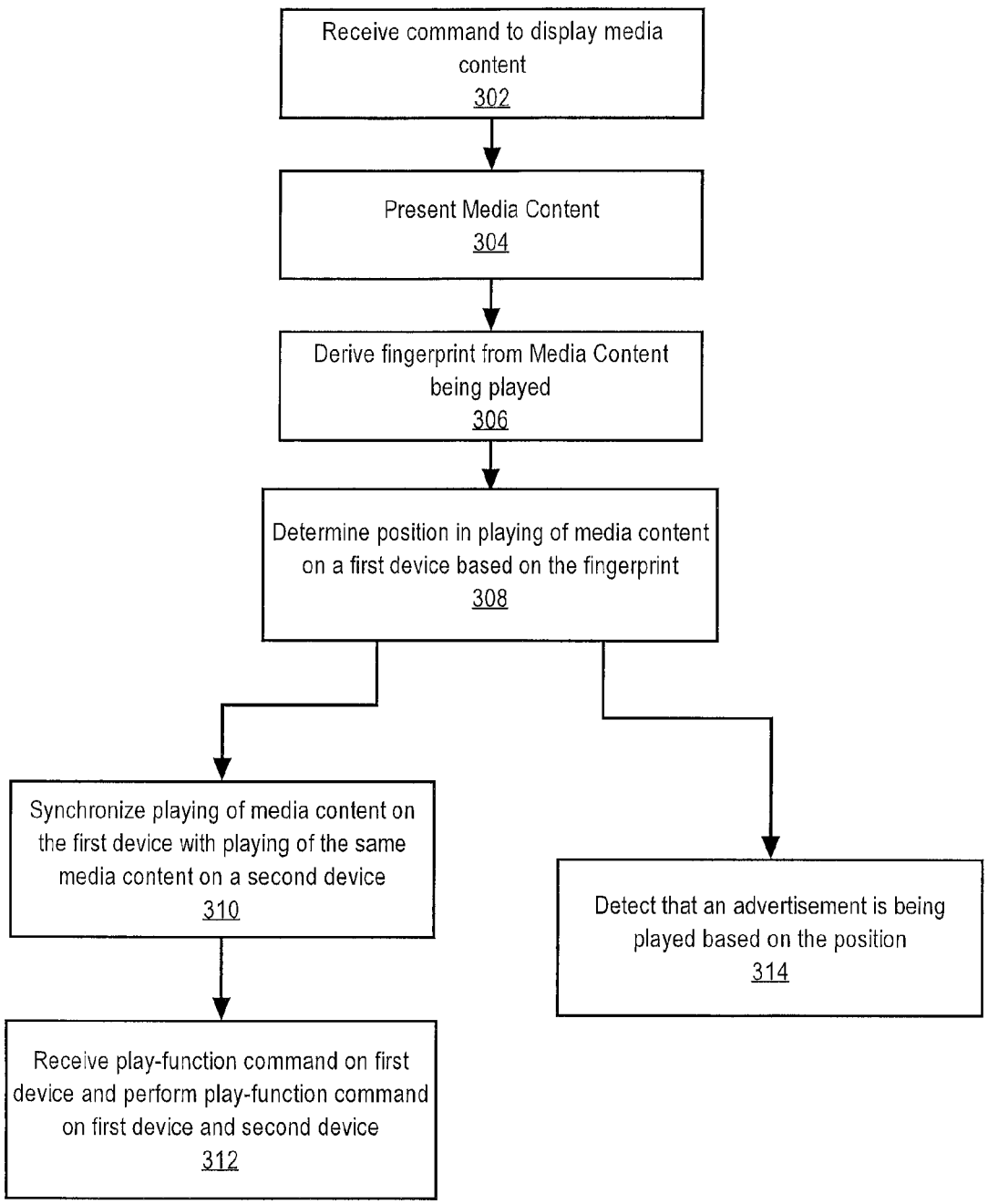
FIG. 3 illustrates a flow diagram for determining a position in the playing of media content in accordance with an embodiment.

FIG. 3 illustrates a flow diagram for determining a position in the playing of media content in accordance with an embodiment. One or more of the steps described below may be omitted, repeated, and/or performed in a different order. Accordingly, the specific arrangement of steps shown in FIG. 3 should not be construed as limiting the scope of the invention.

Initially, a command is received to present media content (Step 302) and the media content is presented (Step 304) in accordance with an embodiment. Step 302 and Step 304 are essentially the same as Step 202 and Step 204 described above.

In an embodiment, a fingerprint is derived from the media content being played (Step 306) to determine the position in the playing of the media content on a first device (Step 308). For example, as a media device receives media content in a content stream (or from any other source), the media device may display the media content and derive fingerprints from the specific frames being displayed. The media device may also derive fingerprints from every nth frame, from iframes, or based on any other frame selection mechanism. A content fingerprint derived from one or more frames may then be compared to a database of fingerprints to identify a database fingerprint that matches the frame fingerprint. The database of fingerprints may be locally implemented on the media device itself or on a server communicatively coupled with the media device. The match between the content fingerprint and the database fingerprint may be an exact match or the two fingerprints may meet a similarity threshold (e.g., at least a threshold number of signature bits in the fingerprint match). Once a match is identified in the database, metadata that is stored in association with the database fingerprint is obtained. The metadata may include a position in the media content. For example, the metadata may indicate that the fingerprint corresponds to the kth frame of n total frames in the media content. Based on this position information and/or the number of frames per second, a position in the playing of the media content may be determined. The metadata may also explicitly indicate the position. For example, the metadata may indicate that the fingerprint corresponds to a playing position at 35 minutes and 3 seconds from the start of the media content.

Based on the position in the playing of the media content on the first device, a second device may be synchronized with the first device by playing the same media content on the second device concurrently, in accordance with one or more embodiments. (Step 310). Once a position of the playing of the media content is determined for the first device, the playing of the media content on the second device may be started at that position. If the media content is already being played on the second device, the playing of the media content on the second device may be stopped and restarted at that position. Alternatively, the playing of the media content on the second device may be fast forwarded or rewound to that position.

In an embodiment, the viewing of a live broadcast or stored program may be synchronized using a buffer incorporated in media devices. For example, the content received in the content stream may be stored on multiple devices as they are received. Thereafter, the devices may communicate to synchronously initiate the playing of the media content, the pausing of media content, the fast forwarding of media content, and the rewinding of media content. A large buffer that can store the entire media content may be used in an embodiment. Alternatively, a smaller buffer can be used and video frames may be deleted as they are displayed and replaced with new video frames received in a content stream. Synchronized playing of a live broadcast or stored program may involve playing a particular frame stored in a memory buffer at a particular time to obtain frame level synchronization. For example, two devices may exchange information that indicates at which second a particular frame stored in memory is to be played and a rate at which future frames are to be played. Accordingly, based on the same start time, the frames may be displayed on different media devices at the exact same time or approximately the same time. Furthermore, additional frame/time combinations may be determined to ensure that the synchronization is maintained. When media devices are being used in different time zones, the times may be adjusted to account for the time difference. For example, Greenwich Mean Time (GMT) may be used across all media devices for synchronized playing of media content.

In an embodiment, after synchronization of multiple devices playing the same media content, the synchronization may be maintained. In order to maintain synchronization any play-function (e.g., stop, fast-forward, rewind, play, pause, etc.) received on one device may be performed on both devices (Step 312).

In an embodiment, the playing of an advertisement may be detected based on the position in the playing of the media content (Step 314). For example, media content available on a content stream may include a television show and advertisements interspersed at various times during the television show. The composition information of the media content may indicate that the television show is played for twenty-five minutes, followed by five minutes of advertisements, followed by another twenty-five minutes of the television show and followed again by another five minutes of advertisements. Accordingly, if the position of the playing of the media content is determined to be twenty minutes from the start, the television show is being played. However, if the position of the playing of the media content is determined to be twenty-seven minutes from the start, an advertisement is being played.

In an embodiment, the playing of an advertisement may be detected without determining the position in the playing of the media content. For example, if the media content includes a television show and advertisements interspersed between the television show, advertisements may be detected based on the fingerprints derived from the media content currently being played. The fingerprints derived from the media content currently being played may be compared to the fingerprints derived only from the television show or fingerprints derived only from the advertisement. Based on the comparison, the media content concurrently being played may be determined to be a portion of the television show or a portion of the advertisement.

In an embodiment, the playing of an advertisement may be detected based on the elements present in the media content. For example, based on the fingerprints derived from the media content being played, faces of actors within the media content may be recognized. The names of the actors may then be compared with the names of actors that are listed as actors in the television show. If the actors detected in the media content being played match the actors listed as actors in the television show, then the television show is being played. Alternatively, if the actors detected in the media content being played do not match the actors listed as actors in the television show, then an advertisement is being played. In an embodiment, a time window may be used for detection of known actors in a television show, where at least one actor listed as an actor in the television show must be detected within the time window to conclude that the television show is being played.

In response to determining that an advertisement is being played, many different actions may be performed in accordance with one or more embodiments. In an embodiment, advertisements may be auto fast-forwarded. For example, as soon as the playing of an advertisement is detected, an automatic fast-forwarding function may be applied to the playing of the media content until the playing of the advertisement is completed (e.g., when playing of a television program is detected again based on a fingerprint). Similarly, advertisements may also be auto-muted, where an un-muting function is selected in response to detecting the completion of the advertisement.

In an embodiment, if the media content is being recorded, an advertisement may automatically be skipped over for the recording. For example, in the recording of a movie being received from a content source, the non-advertisement portions (e.g., movie portions) of the media content may be recorded while the advertisement portions of the media content may be skipped for the recording.

In an embodiment, alternate advertisements may be displayed. When receiving and displaying a content stream, detected advertisement portions of the content stream may be replaced with alternate advertisements. For example, a media device at a sports bar may be programmed to display drink specials instead of the advertisements received in a content stream. Alternatively, advertisements from local vendors, which are stored in memory or streamed from a server, may be displayed instead of advertisements received in the content stream. The advertisements may be selected based on the media content. For example, if during the playing of a sporting event, advertisements directed toward men may be selected.

In an embodiment, the advertisement may be augmented with additional content related to the advertisement. When receiving a content stream, detected advertisement portions of the content stream may be scaled, cropped, or otherwise altered, and the displaced empty space can be programmatically populated by additional content. For example, an advertisement for a movie opening in theaters soon can be augmented with show times at theaters in a 15-mile vicinity of the device. The user may also be presented with one or more interactive functions related to the additional content, such as the option to store information about the advertised movie, including the selected local theater and show time, to be used in future presentation, reference, ticket purchase, or other related activity. In another example, the advertisement may be augmented with games, quizzes, polls, video, and audio related to the advertisement. In an embodiment, the advertisement may be augmented with information about actions taken by the user's social network connections related to the advertisement. For example, an advertisement for a digital camera may be augmented by photos of the user's friends taken with the same digital camera. In another example, an advertisement for a movie recently released on DVD may be augmented with friends' ratings and reviews of that movie.

In an embodiment, the advertisement may be augmented with additional content not related to the advertisement. When receiving a content stream, detected advertisement portions of the content stream may be scaled, cropped, or otherwise altered, and the displaced empty space can be programmatically populated by additional content. In one embodiment, the user may direct the system to use portions of the display during advertisements to display personalized content. In one example, the personalized content may include the latest scores and statistics from the user's favorite sports teams. In another example, the content may include all or some of the user's latest received messages, such as email, SMS, instant messages, social network notifications, and voice mails. In another example, the user may be presented with information about additional content related to the content interrupted by the advertisement. In another example, the user may be presented with the chance to take his turn in a previously started game. In an embodiment, the user may also be presented with one or more interactive functions related to the additional content, such as the option to store information about the content to be used in future presentation, reference, or other related activity. In an example, the user may choose to respond to an SMS, email, voice mail, or instant message using a keyboard or microphone.

In an embodiment, a notification of the playing of an advertisement by a media device may be provided to an interested party (e.g., a vendor or broadcaster). For example, if a vendor advertisement is played on a media device, a content source may be informed that the vendor advertisement was in fact played. Furthermore, if a vendor advertisement was fast forwarded through, the content source may be informed that the vendor advertisement was fast forwarded through. This information may be provided to the vendor in order for the vendor to determine the effectiveness of the advertisement. Additional information including whether the advertisement was played as a part of a previously stored recording or played directly upon receiving from the content source may be provided to an interested party.

In an embodiment, cumulative statistics of a user may also be gathered based on advertisement detection. For example, particular types of advertisements or media content viewed by a user may be documented to determine user interests. These user interests may be provided to a vendor, stored on a server, published on an interactive webpage associated with the user, or otherwise presented. Anonymous information of a plurality of users may be collected to create reports based on user viewing or input. U.S. patent application Ser. No. 10/189,989, owned by the Applicant and incorporated herein by reference, describes such approaches.

5.0 Publishing Recording or Viewing Information

Figure 4:
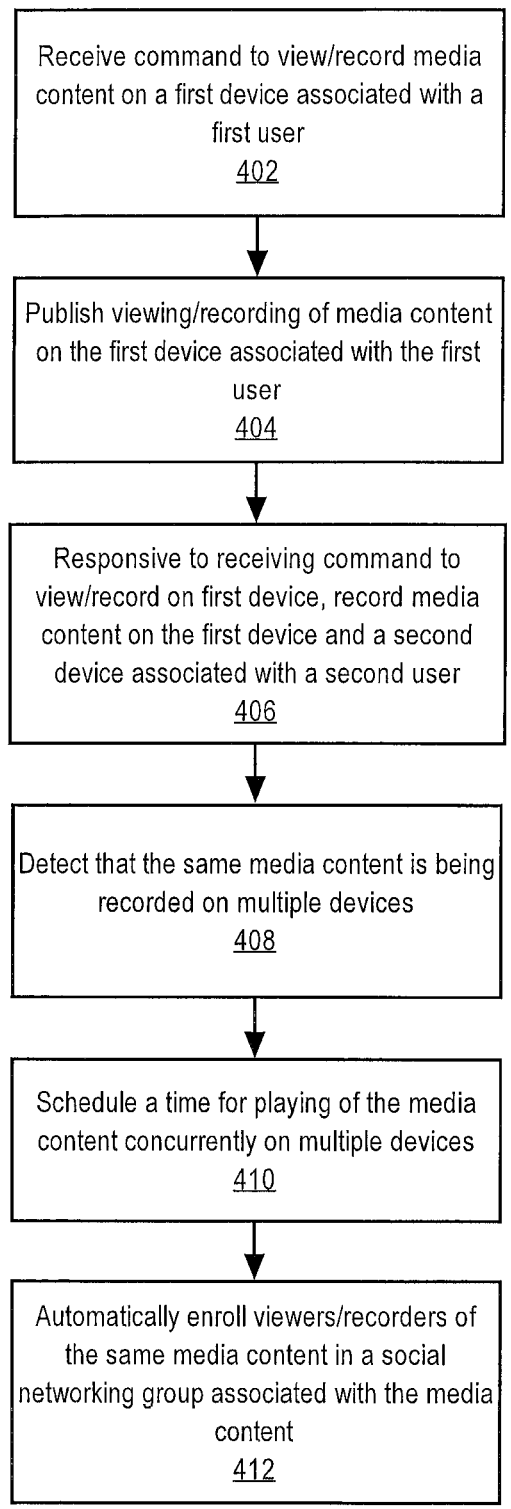
FIG. 4 illustrates a flow diagram for detecting the playing of an advertisement in accordance with an embodiment.

FIG. 4 illustrates a flow diagram for detecting the playing of an advertisement in accordance with an embodiment. One or more of the steps described below may be omitted, repeated, and/or performed in a different order. Accordingly, the specific arrangement of steps shown in FIG. 4 should not be construed as limiting the scope of the invention.

In an embodiment, a command is received to view or record media content on a first device associated with a first user (Step 402). The command to view or record media content may be received by a selection in an electronic programming guide (EPG). The command may be for a single recording of media content (e.g., a movie, a sports event, or a particular television show) or a series recording of media content (e.g., multiple episodes of a television show). A command may be received to play a media content file that is locally stored on memory (e.g., a DVD player may receive a command to play a DVD, a digital video recorder may receive a command to play a stored recording). In an embodiment, a single media device may receive all such commands and instruct the other devices (e.g., a DVD player, a blu-ray player) accordingly.

The viewing or recording of media content on the first device is published in accordance with an embodiment (Step 404). Publishing the viewing or recording of media content may be user specific. For example, the viewing or recording of media content may be posted on a webpage (e.g., a user webpage on a networking website such as MySpace®, or Facebook®) (MySpace® is a registered trademark of MySpace, Inc., Beverly Hills, Calif. and Facebook® is a registered trademark of Facebook, Inc., Palo Alto, Calif.) associated with a user, a posting on a group page (e.g., a webpage designated for a group) may be emailed to other users, may be provided in a text message, or may be published in any other manner. In an embodiment, all the viewing or recording by a user may be automatically emailed to a list of other users that have chosen to receive messages from the user (e.g., using Twitter®, Twitter® is a registered trademark of Twitter, Inc., San Francisco, Calif.). Publishing the viewing or recording of media content may also include a fee associated with the media content. For example, if the user selects a pay per view movie, the cost of the movie may also be published. In an embodiment, publishing the viewing or recording of media content may involve publishing the name of a user (or username associated with the user) on a publication associated with the media content. For example, all the users that have viewed a particular media content may be published on a single web page associated with a social networking website. Any users that have responded (e.g., "like", "thumbs up", "share", etc.) to a posting related to the particular media content, which indicates the user has viewed the particular media content, may be published on the single web page.

In an embodiment, responsive to receiving a command to record media content on the first device associated with a first user, the media content is recorded on the first device and a second device associated with a second user (Step 506). For example, the first device may notify the second device of the scheduled recording of media content and the second device may auto-record the media content. In another example, in response to the notification from the first device, the second device may prompt a second user for recording of the media content. The second device may then record the media content subsequent to receiving a user command to record the media content. In an embodiment, the recording of the media content on the second device may be subsequent to the publication (e.g., on a website) of recording on the first device, as described above. For example, a second user may select a link on a website associated with the publication of recording the media content on the first device, to record the media content on the second device associated with the second user. In an embodiment, a media device may be configured to mimic another media device by recording all programs recorded by the other media device.

The recording of the same media content on multiple devices may be detected in accordance with an embodiment (Step 408). For example, different users within a user group may each schedule the recording of the same media content on their respective media devices. The scheduled recordings of each media device associated with the users within the group may be collected and compared (e.g., by a server, a service, or one of the media devices) to detect any overlapping scheduled recordings. In an embodiment, the already recorded media content on a media device may be compared to the already recorded media content on another media content or to scheduled recordings on another media content.

In an embodiment, a media device may be configured to automatically schedule recordings of any media content that is scheduled for recording by another specified media device. Accordingly, a media device may be configured to mimic another media device identified by a device identification number. The media device may also be configured to mimic any device associated with a specified user. For example, a first user may determine that a second user has a great selection of new shows or programs based on the postings of the second user on a social networking website. The first user may then choose to mimic the television watching habits of the second user by submitting a mimicking request with the identification number of the media device associated with the second user or a name of the second user. Alternatively, the first user may indicate the preference on the social networking website. The social networking website may then communicate the identification of the first user and the second user to a content source, which configures the media device associated with the first user to record the same shows as recorded by the media device associated with the second user.

In an embodiment, each media device may be configured to access a database of media device recording schedules (e.g., on a server, provided by a third party service, etc.). A user may access this database using their own media device and mimic the recordings of another media device that is referenced by the name or identification of a specific user. For example, a user may select specific shows that are also recorded by another user. In an embodiment, the user may be able to access other recording related statistics to select shows for viewing or recording. For example, a media device recording database may indicate the most popular shows based on future scheduled recordings, based on recordings already completed, or based on a number of users that watched the shows as they were made available on the content stream.

A time for playing the media content concurrently on multiple devices may be scheduled in accordance with an embodiment (Step 410). The time for playing the media content may be selected automatically or may be selected based on user input from one or more users. For example, all users associated with media devices that are scheduled for recording (or have already recorded) particular media content may be notified of the overlapping selection and one user may select the time for concurrent viewing of the media content by all the users using their respective media devices. In another example, each media device may access a user availability calendar to determine the available viewing times for a respective user. Thereafter, a synchronous viewing of a show may be scheduled in the calendar such that all the users (or most of the users) are available.

The viewers/recorders of the same media content may be automatically enrolled into a group associated with the media content in accordance with an embodiment (Step 412). For example, all the viewers and/or recorders of a specific movie may be automatically enrolled into a social networking group associated with the movie, in response to each recording/viewing the movie. The auto-enrollment group may be used by users as a forum to discuss the media content, find other users with similar viewing preferences, schedule a viewing time for similar recordings, or for any other suitable purpose. A discussion forum may be initiated for two or more users associated with multiple devices that are synchronously playing media content. The discussion forum may be initiated by the media device inviting a user to join an instant messaging chat (e.g., Yahoo!® Instant Messaging, Google® Chat, AIM®, Twitter®, etc.) (Yahoo!® is a registered trademark of Yahoo!, Inc., Sunnyvale, Calif. | Google® is a registered trademark of Google, Inc., Mountain View, Calif. | AIM® is a registered trademark of AOL LLC, Dulles, Va. | Twitter® is a registered trademark of Twitter, Inc., San Francisco, Calif.), video chat (e.g., Skype®, Skype® is a registered trademark of Skype Limited Corp., Dublin, Ireland), a website thread, or an electronic messaging (email) thread. The discussion forum may include two users or any number of users. The discussion forum may be initiated for users that are already known to be connected. For example, the discussion forum may be initiated if users are friends on a social networking website. In an embodiment, the discussion forum may be created to introduce vendors to potential clients. For example, during the playing of a football game, an invitation may be presented to chat with a vendor of football game tickets. In an embodiment, the discussion forum may be implemented as a dating portal. For example, men and women in the same geographical area that are subscribed to a dating server, who are watching the same show may be invited to a chat by the media device. Another example involves an activity portal. For example, a media device may be configured to invite viewers of a cooking channel show to cook together, or a media device may configured to invite viewers of a travel channel show to travel to a featured destination together. A media device may be configured to communicate, as described above, with any other computing device (e.g., another media device or a personal computer).

6.0 Deriving a Fingerprint from Media Content

Figure 5:
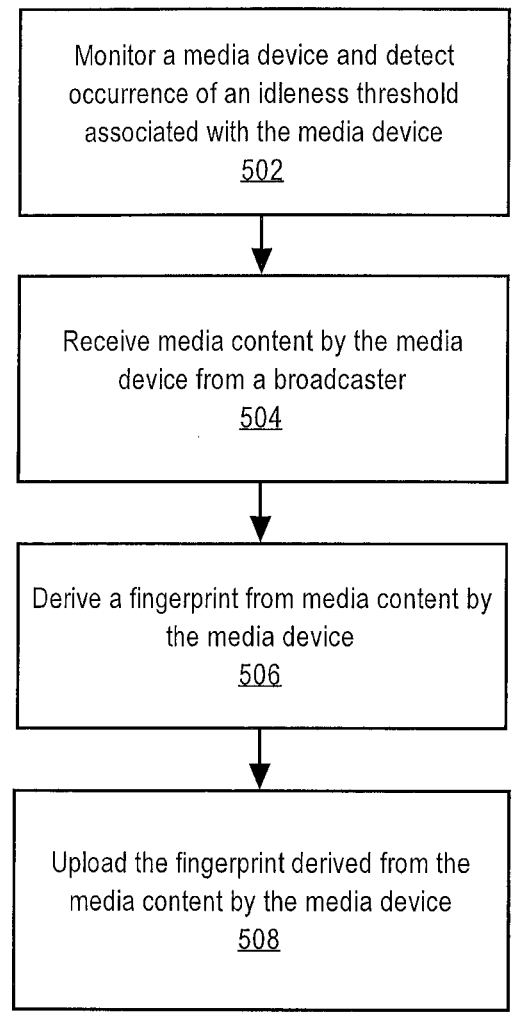
FIG. 5 illustrates a flow diagram for deriving a fingerprint from media content in accordance with an embodiment.

FIG. 5 illustrates a flow diagram for deriving a fingerprint from media content in accordance with an embodiment. One or more of the steps described below may be omitted, repeated, and/or performed in a different order. Accordingly, the specific arrangement of steps shown in FIG. 5 should not be construed as limiting the scope of the invention.

In an embodiment, a media device is monitored to determine that the media device meets an idleness criteria (Step 502). An idleness criteria may be based on non-use of a media device or component, or a usage percentage (e.g., a percentage related to available bandwidth of the total bandwidth or a percentage related to available processing power of the total processing power). The media device may be self monitored or monitored by a server. Monitoring the media device for the idleness criteria may involve detecting completion of a period of time without receiving a user command. Monitoring the media device for the idleness criteria may involve detecting availability of resources needed to receive media content and/or derive a fingerprint from the media content. Monitoring the media device may include separately monitoring different components of a media device. For example, if a user is watching a stored recording on the media device and not recording any additional content being streamed to the media device, the tuner may be idle. Based on this information, a determination may be made that the tuner meets an idleness criteria. Accordingly, different components of the media device may be associated with separate idleness criteria. In another example, components necessary for deriving a fingerprint from media content may meet an idleness criteria.

In an embodiment, the media device receives media content from a content source for the purpose of deriving a fingerprint from the media content (Step 504). The media device may receive media content in response to alerting a content source that the media device (or components within the media device) meet an idleness criteria. In an embodiment, the content source may automatically detect whether a media device meets an idleness criteria. For example, the content source may determine that the media device has not requested to view any particular media content (e.g., broadcast content, web content, etc.). Therefore, the tuner most likely has bandwidth to download media content. In an embodiment, media devices may include the functionality to receive multiple content streams. In this embodiment, the content source may determine how many content streams are being received by the media device. Based on the known configuration and/or functionality of the media device, the content source may determine the tuner's available bandwidth for receiving additional media content. Once the idleness criteria is met, the content source may download a particular media content for the media device to generate a fingerprint.

In an embodiment, the content source may build a database of fingerprints for media content by dividing out the media content to be broadcasted among multiple media devices that meet the idleness criteria. For example, if five thousand devices meet the idleness criteria and two thousand unique media content files are to be fingerprinted, the content source might transmit four unique media content files to each of the five thousand media devices for generating respective fingerprints from the media devices. In an embodiment, the content source may send each unique media content file to two or more media devices in case there is an error with the fingerprint derived from media device, or if the media device is interrupted while deriving the fingerprint. The content source may also direct a media device to fingerprint content which has already been downloaded to the media device (e.g., based on user command). In an embodiment, a user may resume utilizing the media device and thereby prevent or stop the media device from deriving a fingerprint. In an embodiment, the content source may prompt the user to request permission for using the media device when an idleness criteria is met before downloading media content onto the media device. The content source may also offer incentives such as credits to watch pay-per-view movies if the user allows the content source to use the media device to perform and/or execute particular functions (e.g., deriving fingerprints).

In an embodiment, a fingerprint is derived from media content by the media device (Step 506). Any technique may be used to derive a fingerprint from media content. One example is to derive a fingerprint from a video frame based on the intensity values of pixels within the video frame. A function (e.g., that is downloaded onto the media device) may be applied to each of the intensity values and thereafter based on the result, a signature bit (e.g., '0' or '1') may be assigned for the that intensity value. A similar technique may be used for audio fingerprinting by applying the method to spectrograms created from audio data.

The fingerprint may be derived by the media device based on specific instructions from the content source. For example, fingerprints may be derived from all video frames of a particular media content file. Alternatively, the fingerprint may be derived for every nth frame or every iFrame received by the media device. In an embodiment, specific frames to be fingerprinted may be tagged. Tagging techniques are described in application Ser. No. 09/665,921, application Ser. No. 11/473,990, and application Ser. No. 11/473,543, all of which are owned by the Applicant, and herein incorporated by reference. Once a media device receives a frame that is tagged, the media device may then decompress the frame, analyze the frame, and derive a fingerprint from the frame. The video frame fingerprints may be categorized by the media device according to the media content (e.g., by media content name, episode number, etc.).

In an embodiment, the media device may derive fingerprints for media content that is being watched by a user. For example, a user may select a particular show on an electronic programming guide displayed by a media device. The media device may then request the content stream, from the content source, that includes the particular show. As an optional step, the source may indicate whether a fingerprint is needed for the particular show requested by the media device. The indication may be a flag in the data received by the media device. If the particular show needs to be fingerprinted as indicated by the flag, the media device may decompress the corresponding video frames, load the decompressed video frames into memory and analyze the video frames to derive a fingerprint from the video frames. In an embodiment, the user may change the channel mid-way through the playing of the media content being fingerprinted. As a result the tuner may be forced to receive a different content stream. In this case, the media device may have derived fingerprints for only a portion of the media content. The media device may generate metadata indicating the start position and end position in the playing of the media content for which the fingerprint has been derived.

In an embodiment, the media device may then upload the fingerprint derived from the media content (or from a portion of the media content) to a fingerprint server in accordance with an embodiment (Step 508). Thus, a fingerprint database may be built by multiple media devices each uploading fingerprints for media content. Fingerprints received for only a portion of the media content may be combined with other fingerprints from the same media content to generate a complete fingerprint. For example, if one media device generates and uploads fingerprints for video frames in the first half of a program and a second media device generates and uploads fingerprints for a second half of the same program, then the two fingerprints received from the two devices may be combined to obtain fingerprints for all the video frames of the program.

Figure 6:
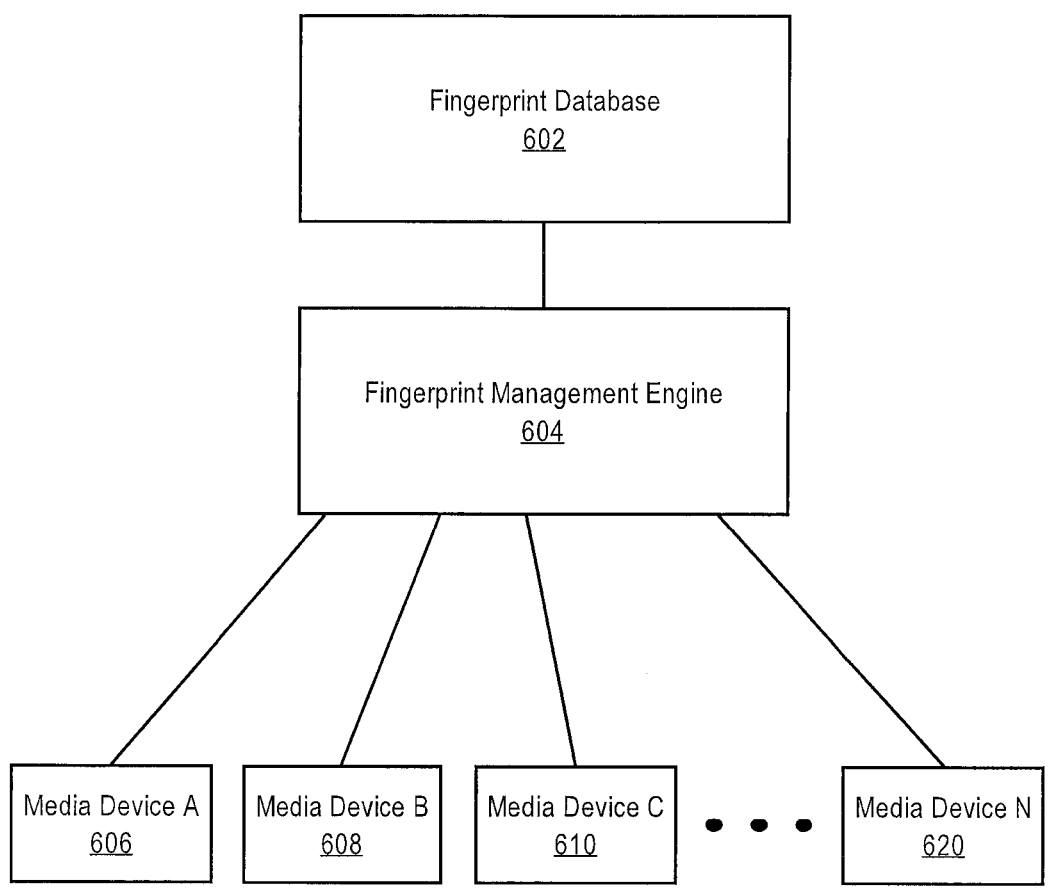
FIG. 6 shows an exemplary architecture for the collection and storage of fingerprints derived from media devices.

An exemplary architecture for the collection and storage of fingerprints derived from media devices, in accordance with one or more embodiments is shown in FIG. 6. The fingerprint management engine (604) generally represents any hardware and/or software that may be configured to obtain fingerprints derived by media devices (e.g., media device A (606), media device B (608), media device C (610), media device N (620), etc.). The fingerprint management engine (600) may be implemented by a content source or other system/service that includes functionality to obtain fingerprints derived by the media devices. The fingerprint management engine (604) may obtain fingerprints for media content already received by the media device (e.g., in response to user selection of the media content or content stream which includes the media content). The fingerprint management engine (604) may transmit media content to a media device specifically for the purpose of deriving a fingerprint. The fingerprint management engine (604) may transmit media content to a media device for fingerprinting in response to detecting that the media device is idle. In an embodiment, the fingerprint management engine (604) maintains a fingerprint database (602) for storing and querying fingerprints derived by the media devices.

7.0 Presenting Messages

Figure 7:
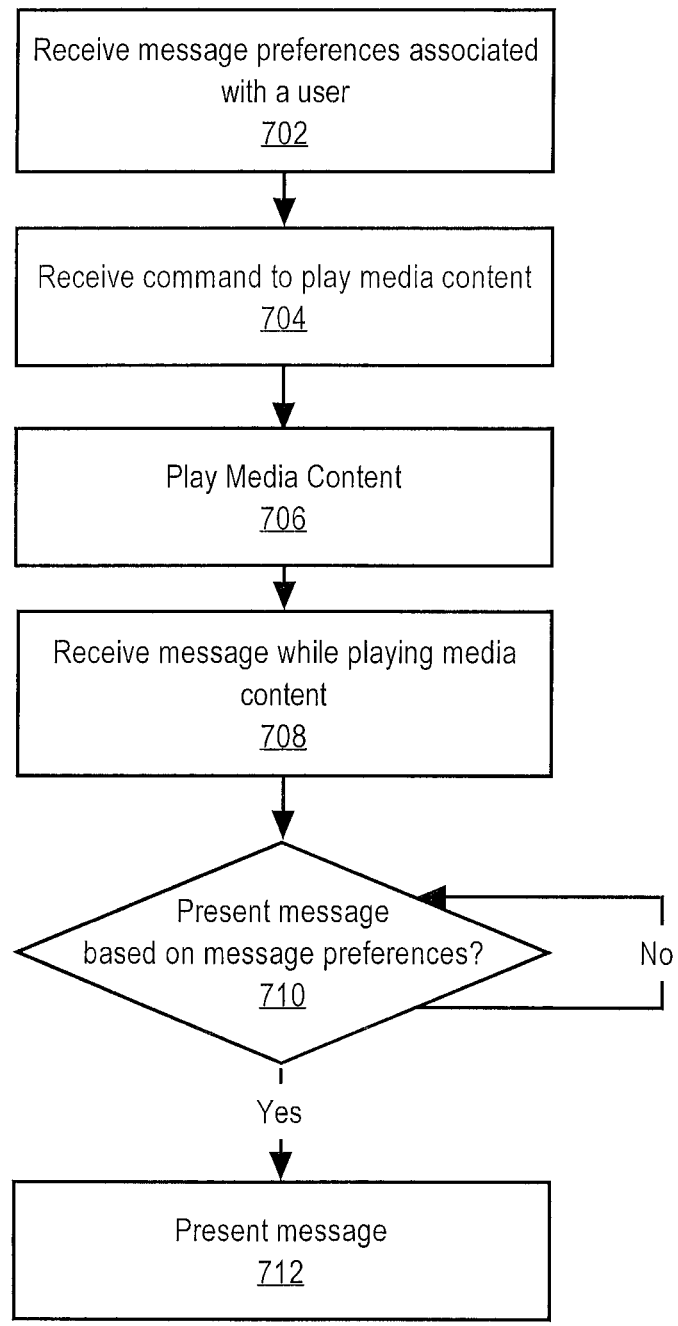
FIG. 7 illustrates a flow diagram for presenting messages in accordance with an embodiment.

FIG. 7 illustrates a flow diagram for presenting messages in accordance with an embodiment. One or more of the steps described below may be omitted, repeated, and/or performed in a different order. Accordingly, the specific arrangement of steps shown in FIG. 7 should not be construed as limiting the scope of the invention.

Initially, message preferences associated with a user are received (Step 702). Message preferences generally represent any preferences associated with message content, message timing, message filtering, message priority, message presentation, or any other characteristics associated with messages. For example, message preferences may indicate that messages are to be presented as soon as they are received or held until a particular time (e.g., when commercials are being displayed). Message preferences may indicate different preferences based on a message source or a message recipient. For example, messages from a particular website, Really Simply Syndication (RSS) feed, or a particular user may be classified as high priority messages to be presented first or to be presented as soon as they are received. Low priority messages may be held for a particular time. Message preferences may indicate whether messages are to be presented as received, converted to text, converted to audio, presented in a particular manner/format/style, etc. Message preferences may be associated with automated actions, where receiving particular messages results in automatically performing specified actions. One or more preferences (e.g., message preferences), viewing history, and/or other information associated with a user make up a user profile.

In an embodiment, message preferences may include a user-defined alert condition. For example, the alert condition may include receiving an email, voicemail, text message, instant message, twitter tweet, etc. that meets a particular condition. An alert condition may include a specific user action performed by a specified list of users. For example, an alert condition may a particular user posting a hiking activity invite on a webpage. The alert condition may be based on particular keywords in a communication, a subject matter associated with a communication, etc. For example, if the word "emergency" or "urgent" is found in the communication, the alert condition may be met. The alert condition may be related to security (e.g., a house alarm or car alarm being set off). The alert condition may be related to kitchen equipment. For example, the alert condition may be linked to an oven timer going off. The alert condition may include a change in status of a user specified entity. For example, the alert condition may be related to when a user on a social networking website changes status from "in a relationship" to "single". An alert condition may include the availability of a particular media content, in a content stream, selected based on a user profile. For example, the user profile may include a viewing history, an actor name, a media content genre, a language associated with the media content. If media content that matches any part of the user profile, the alert condition may be met and an alert may be presented in response.

In an embodiment, message preferences may be received as direct input from a user, determined based on user files, obtained from the internet (e.g., from a web page or other file associated with a user, by querying a database, etc.). The message preferences may be obtained by monitoring the usage patterns on a media device. For example, if usage patterns indicate that a user checks messages immediately upon receiving notifications of a message, the message preferences may indicate that messages are to be displayed or played immediately. Message preferences for a user may also be sender based. For example, the sender of a message may indicate the delivery method and/or delivery preferences. Message preferences may also be randomly (e.g., user input), periodically, or continuously be modified.

In an embodiment, a command to play media content is received (Step 704). The received command may be submitted by a user via a keyboard, remote control, a mouse, joystick, a microphone or any other suitable input device. The command may be a selection in the electronic programming guide (EPG) by a user for the playing of the media content. The command may be a channel selection entered by a user. The command may be a request to display a slide show of pictures. The command may be to play an audio file. The command may be a request to play a movie (e.g., a command for a blu-ray player). In an embodiment, receiving the command to present media content may include a user entering the title of media content in a search field on a user interface. The command to play media content may be a user selection of particular media content that is stored in memory.

In an embodiment, the media content is played (Step 706). In an embodiment, the media content may be played in response to the command or without receiving a command. For example, a user may turn on a media device which is automatically configured to receive a content stream on the last selected channel or a default channel. In an embodiment, the media device may automatically select media content for playing based on user preferences or responsive to playing or recording of the media content on another media device.

In an embodiment, a message may be received while playing media content (Step 708). The message may be received from a local or remote source over a network (e.g., internet, intranet, broadcast service, etc.). A message may be received from a web service through an internet connection. For example, friend messages or status changes associated with a social networking website may be received from a web service. The web service may be configured to provide all messages associated with a social networking website or a filtered selection of messages associated with particular preferences. Another example, may include a Really Simply Syndication (RSS) feed that may be received from a web service associated with news, sports, entertainment, weather, stocks, or any other suitable category. In an embodiment, the message may be received from a content source related to services provided by the content source. For example, the message may indicate the availability of car purchasing service, or the availability of a particular car for sale.

The message may be a direct message to a user or group of users (e.g., voicemail, text message, email, etc.). The message may be received in a form different than the originating form. For example, a text message may be received as an audio file, or the text message may be converted to an audio file by the media device after receipt of the text message. Conversely, an audio file may be received as a text message or converted to a text message. In an embodiment, symbols, abbreviations, images, etc. may be used to represent messages. In an embodiment, a message received in one language may be translated to a different language.

In an embodiment, the receiving the message may include detecting the occurrence of a user-defined alert condition. For example, all messages may be monitored and compared to user-defined alert conditions. In an embodiment, EPG data, an RSS feed, a webpage, an event log, displayed information obtained using OCR or any other source of information may be monitored for occurrence of the alert condition. If any of the messages received match an alert condition, the occurrence of the alert condition may be identified. An alert may be then be immediately presented indicating occurrence of the alert condition. The message indicating occurrence of the alert condition may be interpreted based on user preferences.

A determination may be made whether to present the message immediately, present the message at a later time, or not present the message at all (Step 710). Based on the user preference, a received message may be presented (Step 717) immediately upon receiving, or held until a later time. A message may be presented during commercial breaks, when a user selects the messages for viewing, based on a specified schedule or at another suitable time. The messages may also be filtered out based on user preferences. For example, each received message may be compared to user defined alert conditions to determine if the message matches a user defined alert condition. Messages that match a user defined alert condition may be presented and messages that do not match the user defined alert conditions may be filtered out.

In an embodiment, presenting the message may include presenting the message in a visual format and/or playing the message in an audio format. For example, a message may be presented by loading a media content frame into a frame buffer and overlaying message content in the frame buffer to overwrite a portion of the media content frame. The content of the frame buffer may then be presented on a display screen. In another exemplary implementation, different buffers may be used for media content and for message content, where content for the display screen is obtained from both buffers. In an embodiment, presenting a message may include displaying message information and concurrently playing an audio file with the message information. The message information displayed on the screen and played in the audio file may be the same or different. For example, the display screen may display the face of a person associated with the message or announcing the message, while the audio file may include the actual message. In embodiment, playing an audio message may include muting or lowering the volume associated with the media content be played.

8.0 Interpreting Commands

Figure 8:
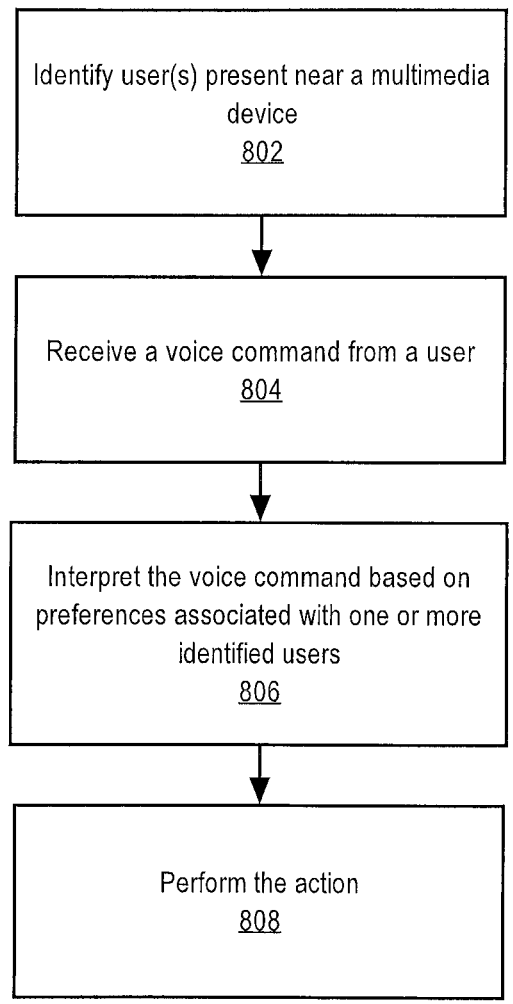
FIG. 8 illustrates a flow diagram for interpreting voice commands in accordance with an embodiment.

FIG. 8 illustrates a flow diagram for interpreting a voice command in accordance with an embodiment. One or more of the steps described below may be omitted, repeated, and/or performed in a different order. Accordingly, the specific arrangement of steps shown in FIG. 8 should not be construed as limiting the scope of the invention.

Initially, one or more users present near a multimedia device are identified (Step 802). One or more users may be identified based on voice input received by the multimedia device or an input device (e.g., a microphone, a remote) associated with the multimedia device. For example, the multimedia device (or an associated input device) may be configured to periodically sample detectable voice input and compare the voice input to data representing user voices to identify known users. The data representing user voices may be generated based on a voice training exercise performed by users for the multimedia device to receive voice samples associated with a user. Users may be identified during an active or passive mode. For example. users may be identified when a user command is received to recognize users or users may be identified automatically without a specific user command. Although voice identification is used as an example, other means for recognizing users may also be used. For example, user names may be entered via an input device (e.g., keyboard, mouse, remote, joystick, etc.). Users may be identified based on metadata associated with the household. Users may be identified using fingerprint detection on the media device or fingerprint detection on another communicatively coupled device (e.g., a remote).

In an embodiment, a voice command is received from a user (Step 804). A voice command may be received by a user first indicating that a voice command is to be given. For example, a user may say a keyword such as "command" or enter input on a device such as a remote indicating that the user is going to submit a voice command. A voice command may be received by continuously processing all voice input and comparing the voice input to known commands to determine if a voice command was submitted. For example, voice input in the last n seconds from the current time may be continuously submitted for analysis to determine if a voice command was received in the last n seconds. In an embodiment, different portions of the voice command may be received from different users. For example, a command "record" may be received from a first user and various titles of programs/shows may be received from multiple users. Examples of other commands include "order pizza", "tweet this game is amazing", "wall post who wants to come watch the emmys", etc. Although a voice command is used in this example, any type of input (e.g., using a mouse, a keyboard, a joystick) may be accepted.

The command may be interpreted based on preferences (e.g., in a user profile) associated with one or more identified users (Step 806) to determine an action to be performed (Step 808). Interpreting a command may involve determining whether the command is applicable to one user (e.g., the user giving the command) or multiple users (e.g., including multiple users identified in Step 802). A particular command word may be indicative of a single user command or a multiple user command. For example, tweet commands may be interpreted by default as a command applicable to a single user, e.g., the user submitting the command. Furthermore, the command may be interpreted based on the user's preferences/settings. If the user submitting the command "tweet this game is amazing" is associated with a twitter account, then the action to be performed is to generate a tweet for the user's twitter account including the words "this game is amazing". Another example of a command applicable to a single user includes "wall post who wants to come watch the emmys". In this case, the command by a user may be recognized as a Facebook wall post and the message "who wants to come watch the emmys" may be posted on the user's Facebook profile. The multimedia device may be configured to associate certain types of commands with multiple user commands. For example, orders for food may be associated with all the identified users. A command "order pizza" may be interpreted as an order for pizza with toppings matching the preferences of all the identified users. A command "buy tickets" may be interpreted as an order to purchase tickets for all the identified users for a football game currently being advertised on television. A command may be intentionally vague for complete interpretation based on the identified users. For example, the command "play recorded show" may result in evaluating each recorded show on a media device to determine how many identified users prefer the recorded show based on user preferences. Thereafter, the recorded show that matches the preferences of the largest number of identified users is selected for playing.

In an embodiment, all or a portion of command interpretations may be confirmed with a user before execution. For example, when ordering pizza, the pizza toppings selected based on user preferences may be presented for confirmation. Another example involving confirmation of commands may involve any orders requiring money or a threshold amount of money.

In an embodiment, a command may be interpreted based on permissions associated with a user and the command may be performed only if the user giving the command has the permission to give the command. For example, a recording and/or playing of a rated R movie may be restricted to users over the age of seventeen. A profile may be setup for each user including the age of the user. If an identified user over the age of seventeen gives the command to record/play an R rated movie, the command is executed. However, if a user under the age of seventeen gives the command to record/play the R rated movie, the command is denied. In an embodiment, a command may be interpreted based on the religious and/or political beliefs of a user. For example, an election coverage program sponsored by the democratic party may be recorded if a democratic user submits a command to record election coverage and an election coverage program sponsored by the republican party may be recorded if a republican user submits the command.

In an embodiment, a language used to submit a command may be used to interpret the command. For example, if a command to record a show is submitted in French, the French subtitles may be selected out of a set of available subtitle streams and recorded with the show. In another example, if multiple audio streams are available in different languages, the audio stream selected may be based on the language of the command.

9.0 Correlating Input with Media Content

Figure 9:
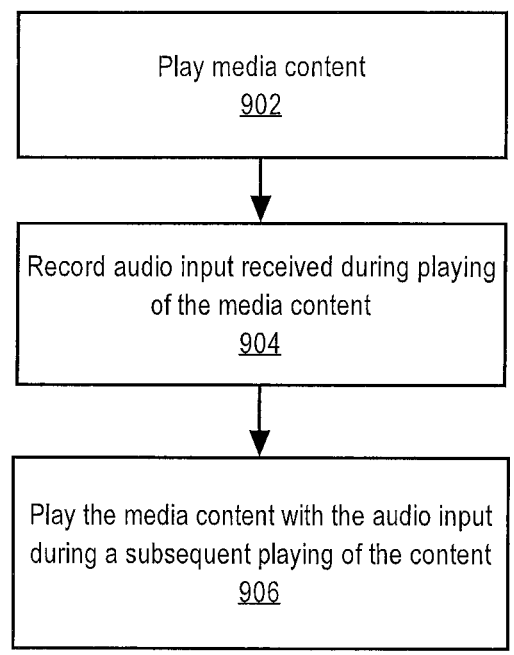
FIG. 9 illustrates a flow diagram for correlating annotations with media content in accordance with an embodiment.

FIG. 9 illustrates a flow diagram for correlating annotations with media content in accordance with an embodiment. One or more of the steps described below may be omitted, repeated, and/or performed in a different order. Accordingly, the specific arrangement of steps shown in FIG. 9 should not be construed as limiting the scope of the invention. Furthermore, although specific types of annotations (e.g., audio, textual, graphical, etc.) may be discussed in the examples below, embodiments of the invention are applicable to any type of annotation.

In an embodiment, media content is played (Step 902). The media content may include both audio and video content, or the media content may include video content alone. Concurrently with playing of the media content, audio input received from a user may be recorded (Step 904). The audio input received from a user may be general reactions to the media content. For example, the audio input may include laughter, excitement (e.g., gasps, "wow", etc.), commentary, criticisms, praises, or any other reaction to the media content. In an embodiment, the commentary may include audio input intended for a subsequent playing of the media content. For example, in a documentary film about tourist destinations, a user may submit voice input which includes stories or memories associated with the particular tourist destination being featured. In another example, a band may provide song lyrics during a particular portion of the media content for recording in association with that portion of the media content. In another embodiment, a user may provide commentary, plot synopsis, character lines, or any other information about the media content in an alternate language during the playing of the media content in the original language. Different versions of audio input (e.g., by the same user or by different users) may be recorded in association with particular media content. In an embodiment, the audio input may be provided with instructions for intended playback information. For example, the playback information may indicate that the submitted audio is to replace the original audio entirely, or played in concurrently with the original audio. In an embodiment, the audio input may be automatically generated by a text-to-speech translator which generates speech based on text associated with the media content. For example, speech in an alternate language may be generated based on the closed caption text in the alternate language. In an embodiment, optical character recognition may be used to identify building names, letters, team names, etc. displayed on a screen and converted to audio for visually impaired audiences, or for audiences that cannot read the information (e.g., due to language barriers or age). In an embodiment, audio input may be received concurrently with playing a particular portion of the media content and stored in association with that particular portion of the media content.

In an embodiment, the media content is subsequently played with the audio input received during a previous playing of the media content (Step 906). Playing the additional audio input received during the previous playing of the media content may include completely replacing the original audio stream or playing concurrently with the original audio stream. In an embodiment, the additional audio input may be a feature that can be turned on or off during the playing of the corresponding media content. In an embodiment, multiple versions of additional audio input may be offered, where a user selects the particular additional audio input for playing during playing of the media content. For example, an online community may be established for submitting and downloading commentary to be played with different movies. Different users with different media devices may record audio input in association with a particular movie (or other content) and thereafter upload the audio input for association with that movie. When a purchaser of the movie downloads the movie, the purchaser may be able to select a commentary (e.g., audio input) by another user to be downloaded/played with the movie. If a purchaser finds the commentary by a particular user hilarious, the purchaser may set the particular user as a default commentator and download all commentaries by the particular user when downloading a movie (or other media content).

Although audio input is used an example of annotations of media content, any type of annotations may be used in accordance with embodiments of the invention. For example, during the playing of media content, text may be entered or images may be submitted by one or more users. In an embodiment, all or part of an annotation or collection of annotations may be processed or analyzed to derive new content. In an embodiment, a collection of annotations associated with the same media content may be compared to identify annotations patterns. For example, a collection of annotations can be analyzed to determine the most annotated point within media content. Accordingly, a scene or actor which resulted in the greatest amount of user excitement (or other emotion) may be identified via annotations during a scene. In another example, user content included in a collection of annotations, such as text or voice notes can be analyzed to determine collective user sentiment (e.g., the funniest scene in a movie, or the funniest movie released in 2009).

10.0 Eliciting Annotations by a Personal Media Device

In an embodiment, any annotations (including audio input, textual input, graphical input, etc.) may be elicited before, during, or after presenting media content by a personal media device associated with a user. Eliciting annotations may be based on selections by an administrator, content producer, content director, etc. For example, a user may be prompted by a media device for a review (e.g., vote, rating, criticism, praise, etc.) at the conclusion of each performance within a presentation of a talent contest within media content in the content stream that was received by the media device and displayed by the media device. In an embodiment, elicited annotations (or other annotations) may be associated with the media content as a whole rather than a specific point within the media content such as when the audio input was submitted. The annotations of one or more users may then be processed (e.g., to count votes, scores, etc.) for the media content.

In an embodiment, the audio input may be elicited from a user by a media device to build a user profile. For example, reactions to different media content may be elicited from a user. Based on the reactions, a user profile may be automatically created which may include users interests, likes, dislikes, values, political views etc. The automatically created profile may used for a dating service, a social networking website, etc. The automatically generated profile may be published on a webpage (e.g., of a social networking website).

In an embodiment, the system can elicit user annotations to identify information associated with media content. For example, annotations may be elicited for identification of a face which although detected, cannot be identified automatically. A system may also be configured to elicit annotations from a parent, after media content has been played, indicating whether the media content is appropriate for children.

11.0 Marking Media Content

In an embodiment, annotations may be used by a user to mark a location in the playing of media content. For example, a user may submit audio input or textual input during the playing of media content that includes a particular keyword such as "mark", "note", "record", etc. that instructs the system to mark a current location in the playing of the media content. The system may automatically mark a particular location based on user reaction. For example, user input above a certain frequency or a certain decibel level may indicate that the user is excited. This excitement point may be stored automatically. In an embodiment, the marked points may include start points and/or end points. For example, periods of high user activity which may correlate to exciting portions of a sports game may be marked by start and end points. A parent may mark start and end points of media content that are not appropriate for children and thus, the marked portion may be skipped during playback unless a password is provided. A user may mark a section in a home video that was eventful. As a result of the user marking the point or the automatic marking based on user reaction, an annotation may be stored in association with the point. The annotation may embody a reference to the original content, a time, or frame offset from the start of the original content, and the UTC when the user marked the point. Although audio input may used as an example, input may be submitted by pressing a key on a remote, clicking on a mouse, entering a command on a keyword, or using any other input method.

In an embodiment, marking (or identifying) a particular point in media content may involve marking a media frame. For example, media frames may be marked using tags, as described in Applicant owned patent application Ser. No. 09/665,921 filed on Sep. 20, 2000, which is hereby incorporated by reference. Another example may involve marking a media frame using hash values, as described in Applicant owned patent application Ser. No. 11/473,543 filed on Jun. 22, 2006, which is hereby incorporated by reference. In an embodiment, marking a particular point in the media content may involve deriving a fingerprint from one or more frames in the media content and using the fingerprint to recognize the particular point in the media content. In an embodiment, a particular point may be marked by storing a time interval from a starting point in the playing of the media content.

In an embodiment, a user marked location may be selected by the user at a later time. For example, the user may be able to scan through different user marked locations during the playing of the media content by pressing next or scan. An image from each of the marked points may be presented to the user, where the user can select a particular image and start/resume the playing of the media content from the corresponding user marked point. User annotations may be used to dynamically segment media content into different parts. User annotations may also be used to filter out certain portions (e.g., periods of no annotations/excitement) of media content and play the remaining portions of the media content in a subsequent playing of the media content.

12.0 Publication of Media Content Annotations

In an embodiment, all or part of an annotation may be published (e.g., referenced or presented on a web site or web service). In an embodiment, all or part of an annotation may be automatically presented to a user on another system. In an example, a user can request the system to send all or parts of annotations to an email or SMS address. In another example, a user can request the system automatically add a movie to an online shopping cart or queue when another user (e.g., a movie critic or friend) positively annotates the movie. In an embodiment, annotations of media content may be sold by a user in an online community for the sale or trade of media content annotations. In an embodiment, annotations (e.g., media content with embedded annotations) may be directed sent from one media device to another media device (e.g., through email, intranet, internet, or any other available method of communication).

13.0 Automatically Generated Annotations

In an embodiment, the system can derive annotation content for media content from the closed-captioning portion of the media content. In an example, the system can produce an annotation that includes a proper name recognized by a natural language processing system and/or a semantic analysis system, and then associate the annotation with the video content where the proper name appears in closed caption. In another example, the system can produce an annotation indicating the start of a commercial break when the phrase "we'll be back after these words" or a similar phrase is recognized in the closed captioning. Another example includes a system producing an annotation associated with a region of media content that contains explicit closed caption language. The system may then provide an option to automatically mute the audio portion of the media content associated with the explicit closed caption language.

In an embodiment, the system can generate audio input utilizing optical character recognition systems. In an example, the system can produce an annotation that includes the title of a movie being advertised. For example, the annotation may display the movie title (e.g., at the bottom of a screen) as soon as the title of the movie is identified or at the end of a movie trailer. In another example, the system can produce an audio annotation that includes the names of cast members from video content corresponding to credits. Another example may involve the system producing an annotation indicating a change in score during a sports game by analyzing OCR-derived data inside the ticker regions of a sporting event broadcast.

In an example, the system may detect a user is navigating an electronic programming guide (EPG) by recognizing a collection of show and movie titles from the OCR. The system may then produce a visual annotation on the EPG recommending the highest-rated show listed in the EPG. In an embodiment, the annotation may also include other contextual information that can be used to further optimize recommendations. For example, the annotation may be based on content recently viewed by the user, which can be used to recommend content from the EPG in the same genre or starring the same actors.

In an embodiment, the system can derive annotation content utilizing speech-to-text systems. For example, the system can produce a transcript of the dialogue in media content to be used in a future presentation when audio is muted or when requested by the hearing impaired. In an embodiment, the derived transcript can be processed by a separate system that monitors presence of topics or persons of interest and then automatically produces annotations associated with topics or persons of interest.

14.0 Environment Configuration

Figure 10:
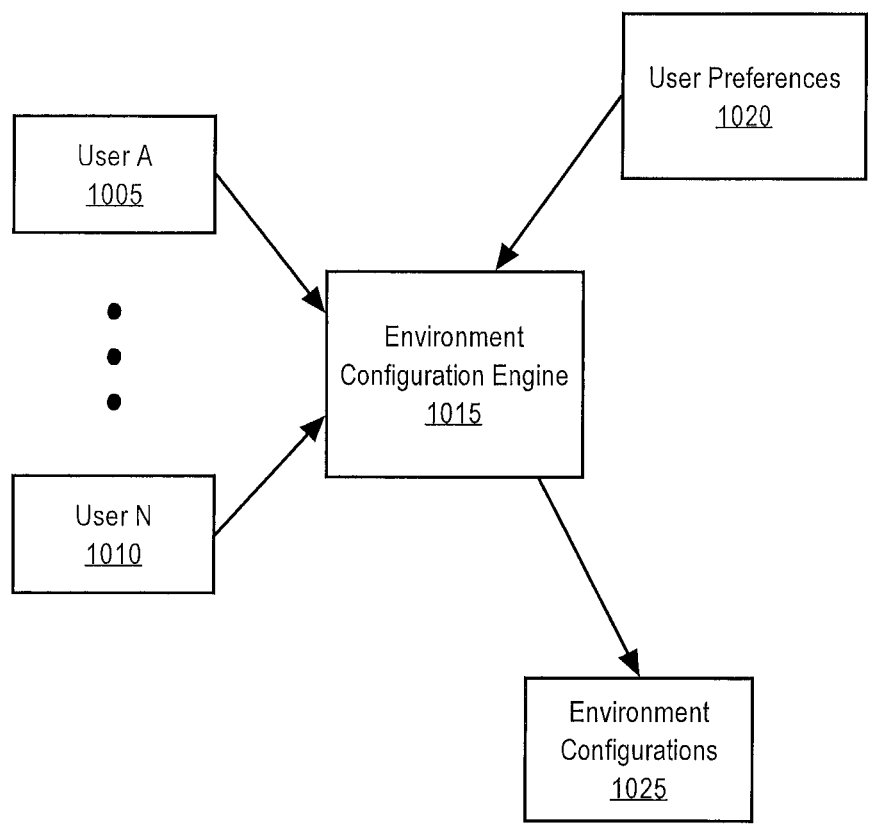
FIG. 10 shows an exemplary system for configuring an environment in accordance with one or more embodiments.

FIG. 10 shows an exemplary system for configuring an environment in accordance with one or more embodiments. In an embodiment, the environment configuration engine (1015) generally represents any software and/or hardware that may be configured to determine environment configurations (1025). The environment configuration engine (1015) may be implemented within the media device, shown in FIG. 1B or may be implemented as a separate component. The environment configuration engine (1015) may identify one or more users (e.g., user A (1005), user N (1010), etc.) that are within close proximity of the environment configuration engine (1015) and identify user preferences (1020) associated with the identified users. The users may be identified based on voice recognition or based on other input identifying the users. Based on the user preferences (1020), the environment configuration engine may configure a user interface, an audio system configuration, a room lighting, a game console, a music playlist, a seating configuration, or any other suitable environmental configurations (1025). For example, if five friends are identified, which are associated with a group user preference, a channel streaming a sports game may be automatically selected and surround sound may be selected for the audio stream(s) associated with the sports game. Another example may involve identifying a couple, and automatically initiating the playing of a romantic comedy.

15.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
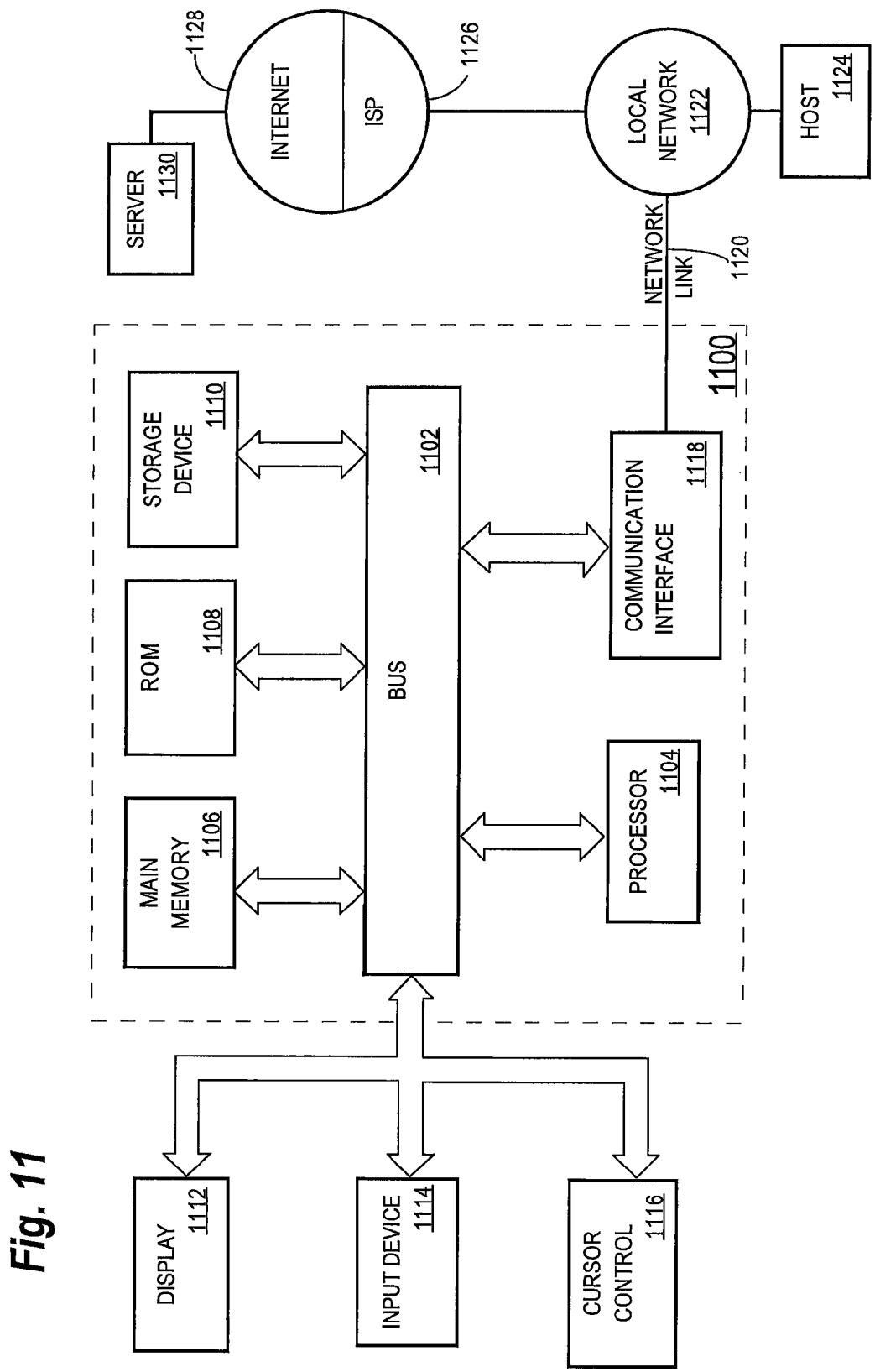
FIG. 11 shows a block diagram that illustrates a system upon which an embodiment of the invention may be implemented.

For example, FIG. 11 is a block diagram that illustrates a System 1100 upon which an embodiment of the invention may be implemented. System 1100 includes a bus 1102 or other communication mechanism for communicating information, and a hardware processor 1104 coupled with bus 1102 for processing information. Hardware processor 1104 may be, for example, a general purpose microprocessor.

System 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render System 1100 into a special-purpose machine that is customized to perform the operations specified in the instructions.

System 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

System 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 11111, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

System 1100 may implement the techniques described herein using customized hard-wired logic, one or more ASICs or FPGAs, firmware and/or program logic which in combination with the System causes or programs System 1100 to be a special-purpose machine. According to one embodiment, the techniques herein are performed by System 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to System 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

System 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 11211. ISP 11211 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from System 1100, are example forms of transmission media.

System 1100 can send messages and receive data, including program code, through the network(s), network link 1120 and communication interface 1118. In the Internet example, a server 1130 might transmit a requested code for an application program through Internet 1128, ISP 11211, local network 1122 and communication interface 1118.

The received code may be executed by processor 1104 as it is received, and/or stored in storage device 1110, or other non-volatile storage for later execution. In an embodiment, an apparatus is a combination of one or more hardware and/or software components described herein. In an embodiment, a subsystem for performing a step is a combination of one or more hardware and/or software components that may be configured to perform the step.

16.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
playing media content comprising an advertisement portion and a non-advertisement portion;
deriving one or more fingerprints from at least a portion of the media content being played;
detecting, based on the one or more fingerprints, one or more faces in the media content;
obtaining name information associated with the one or more faces;
determining that the name information does not match actor information associated with the non-advertisement portion of the media content;
in response to determining that the name information does not match actor information associated with the non-advertisement portion of the media content, determining that the one or more fingerprints are associated with the advertisement portion of the media content;
wherein the method is performed by a device comprising a processor.

2. The method as recited in claim 1, further comprising automatically fast forwarding through the advertisement portion.

3. The method as recited in claim 1, further comprising automatically muting an audio portion of the advertisement portion.

4. The method as recited in claim 1, further comprising replacing the advertisement portion with one or more alternate advertisements.

5. The method as recited in claim 1, further comprising recording only the non-advertisement portion of the media content.

6. A non-transitory computer readable storage medium storing a set of instructions, which when executed by a processor, cause performance of the steps comprising:
playing media content comprising an advertisement portion and a non-advertisement portion;
deriving one or more fingerprints from at least a portion of the media content being played;
detecting, based on the one or more fingerprints, one or more faces in the media content;
obtaining name information associated with the one or more faces;
determining that the name information does not match actor information associated with the non-advertisement portion of the media content;
in response to determining that the name information does not match actor information associated with the non-advertisement portion of the media content, determining that the one or more fingerprints are associated with the advertisement portion of the media content.

7. The non-transitory computer readable storage medium as recited in claim 6, the steps further comprising automatically fast forwarding through the advertisement portion.

8. The non-transitory computer readable storage medium as recited in claim 6, the steps further comprising automatically muting an audio portion of the advertisement portion.

9. The non-transitory computer readable storage medium as recited in claim 6, the steps further comprising replacing the advertisement portion with one or more alternate advertisements.

10. The non-transitory computer readable storage medium as recited in claim 6, the steps further comprising recording only the non-advertisement portion of the media content.

11. An apparatus comprising:
    a subsystem, implemented at least partially in hardware, that plays media content, comprising an advertisement portion and a non-advertisement portion;
    a subsystem, implemented at least partially in hardware, that derives one or more fingerprints from at least a portion of the media content being played;
    a subsystem, implemented at least partially in hardware, that detects, based on the one or more fingerprints, one or more faces in the media content;
    a subsystem, implemented at least partially in hardware, that obtains name information associated with the one or more faces;
    a subsystem, implemented at least partially in hardware, that determines that the name information does not match actor information associated with the non-advertisement portion of the media content;
    a subsystem, implemented at least partially in hardware, that, in response to determining that the name information does not match actor information associated with the non-advertisement portion of the media content, determines that the one or more fingerprints are associated with the advertisement portion of the media content.

12. The apparatus as recited in claim 11, the steps further comprising:
    a subsystem, implemented at least partially in hardware, that automatically fast forwards through the advertisement portion.

13. The apparatus as recited in claim 11, the steps further comprising:
    a subsystem, implemented at least partially in hardware, that automatically mutes an audio portion of the advertisement portion.

14. The apparatus as recited in claim 11, the steps further comprising:
    a subsystem, implemented at least partially in hardware, that replaces the advertisement portion with one or more alternate advertisements.

15. The apparatus as recited in claim 11, the steps further comprising:
    a subsystem, implemented at least partially in hardware, that records only the non-advertisement portion of the media content.

\* \* \* \* \*